(12) United States Patent
Nakabayashi et al.

(10) Patent No.: US 11,665,999 B2
(45) Date of Patent: Jun. 6, 2023

(54) HARVESTER WITH CLOG DETERMINING UNIT

(71) Applicant: Kubota Corporation, Osaka (JP)

(72) Inventors: Takashi Nakabayashi, Sakai (JP); Sotaro Hayashi, Sakai (JP); Masayuki Horiuchi, Sakai (JP); Mitsuhiro Seki, Sakai (JP); Kyosuke Yamaoka, Sakai (JP); Toshiki Watanabe, Sakai (JP); Takanori Hori, Sakai (JP)

(73) Assignee: Kubota Corporation, Osaka (JP)

( * ) Notice: Subject to any disclaimer, the term of this patent is extended or adjusted under 35 U.S.C. 154(b) by 142 days.

(21) Appl. No.: 16/764,274

(22) PCT Filed: Nov. 16, 2018

(86) PCT No.: PCT/JP2018/042392
§ 371 (c)(1),
(2) Date: May 14, 2020

(87) PCT Pub. No.: WO2019/107176
PCT Pub. Date: Jun. 6, 2019

(65) Prior Publication Data
US 2020/0367434 A1    Nov. 26, 2020

(30) Foreign Application Priority Data

Nov. 28, 2017  (JP) .............................. JP2017-228194
Jun. 28, 2018  (JP) .............................. JP2018-123590
Aug. 1, 2018   (JP) .............................. JP2018-145122

(51) Int. Cl.
*A01D 41/127* (2006.01)
*A01D 75/18* (2006.01)
(Continued)

(52) U.S. Cl.
CPC ......... *A01D 61/04* (2013.01); *A01D 41/1208* (2013.01); *A01D 41/1271* (2013.01);
(Continued)

(58) Field of Classification Search
CPC .............. A01D 41/127; A01D 41/1271; A01D 41/1272; A01D 41/1273; A01D 41/1274;
(Continued)

(56) References Cited

U.S. PATENT DOCUMENTS 5,469,356 A *  11/1995  Hawkins .............. G05D 1/0038
                                                    318/591
5,855,108 A *   1/1999  Salz ..................... A01D 75/182
                                                    56/10.2 G
(Continued)

FOREIGN PATENT DOCUMENTS

CN       106576580 A      4/2017
DE       10241216 A1 *    3/2004    ........... A01D 41/127
(Continued)

*Primary Examiner* — Adam J Behrens
*Assistant Examiner* — Madeline I Runco
(74) *Attorney, Agent, or Firm* — The Webb Law Firm

(57) ABSTRACT

A harvester capable of autonomous travel in a field includes: a harvesting unit that harvests a crop from the field; a conveyance device that conveys, toward the rear of a harvester body, a whole culm of the harvested crop harvested by the harvesting unit; a detection sensor that detects a drive speed of the conveyance device; and a clog determining unit that determines a clog of the harvested crop in the conveyance device on the basis of the drive speed. The clog determining unit outputs a vehicle stop command that stops the harvester body when the drive speed becomes lower than a pre-set first threshold during the autonomous travel.

2 Claims, 13 Drawing Sheets

(51) Int. Cl.
*A01D 61/04* (2006.01)
*A01D 41/12* (2006.01)
*A01D 61/00* (2006.01)
*A01D 69/00* (2006.01)
*A01F 12/18* (2006.01)

(52) U.S. Cl.
CPC ....... *A01D 41/1274* (2013.01); *A01D 61/002* (2013.01); *A01D 61/008* (2013.01); *A01D 69/00* (2013.01); *A01D 75/182* (2013.01); *A01F 12/18* (2013.01)

(58) Field of Classification Search
CPC ............ A01D 41/1275; A01D 41/1276; A01D 41/1277; A01D 41/1278; A01D 75/182; A01D 75/185; A01D 75/187; A01D 61/00–61/04; A01D 41/00–41/16; A01B 69/00–69/028; B60W 2300/158
See application file for complete search history.

(56) References Cited

U.S. PATENT DOCUMENTS

| | | | | |
|---|---|---|---|---|
| 7,188,015 | B2* | 3/2007 | Lange | B62D 5/04 701/50 |
| 7,520,806 | B2* | 4/2009 | Bundy | A01D 41/1274 56/11.2 |
| 9,399,472 | B2* | 7/2016 | Minoiu-Enache | B60W 50/02 |
| 9,795,081 | B2* | 10/2017 | Middelberg | A01D 41/1274 |
| 9,841,768 | B2* | 12/2017 | Hiramatsu | A01B 69/008 |
| 9,955,628 | B2* | 5/2018 | Gonzalez-Mohino | A01D 69/025 |
| 10,253,478 | B2* | 4/2019 | Matsuzaki | G05D 1/0061 |
| 10,791,670 | B2* | 10/2020 | Gonzalez-Mohino | A01D 34/003 |
| 2006/0195238 | A1* | 8/2006 | Gibson | G05D 1/0061 701/23 |
| 2016/0066506 | A1 | 3/2016 | Middelberg et al. | |

FOREIGN PATENT DOCUMENTS

| | | | |
|---|---|---|---|
| DE | 102014118781 A1 | 6/2016 | |
| EP | 3348135 B1 * | 10/2019 | ......... A01D 41/1274 |
| JP | 6322768 B2 | 5/1988 | |
| JP | 6437223 A | 2/1989 | |
| JP | 889076 A | 4/1996 | |
| JP | 2538297 Y2 | 6/1997 | |
| JP | 1075645 A | 3/1998 | |
| JP | 200032833 A | 2/2000 | |
| JP | 2003304733 A | 10/2003 | |
| JP | H3904917 B2 | 1/2007 | |
| JP | 2008148651 A | 7/2008 | |
| JP | 2009225761 A | 10/2009 | |
| JP | 201051220 A | 3/2010 | |
| JP | 2012244957 A | 12/2012 | |
| JP | 5170422 B2 | 1/2013 | |
| JP | 201433670 A | 2/2014 | |
| JP | 2014183800 A | 10/2014 | |
| JP | 201735017 A | 2/2017 | |
| JP | 6322768 B2 | 5/2018 | |

* cited by examiner

HARVESTER WITH CLOG DETERMINING UNIT

CROSS-REFERENCE TO RELATED APPLICATIONS

This application is the United States national phase of International Application No. PCT/JP2018/042392 filed Nov. 16, 2018, and claims priority to Japanese Patent Application No. 2017-228194 filed Nov. 28, 2017, Japanese Patent Application No. 2018-123590 filed Jun. 28, 2018, and Japanese Patent Application No. 2018-145122 filed Aug. 1, 2018, the disclosures of which are hereby incorporated by reference in their entirety.

TECHNICAL FIELD

The present invention relates to a harvester capable of traveling autonomously in a field.

BACKGROUND ART

A conveyance device in a harvester continuously conveys a harvested crop which has been harvested by a harvesting unit. Thus if the drive state of the conveyance device deteriorates, not only can harvesting operations not be carried out correctly, but there is also a risk of damaging the conveyance device. To avoid this problem, the harvester disclosed in Patent Document 1 includes a detection sensor (called "conveyor load detection means" in the document) that detects a load on a conveyance device (called an "FH conveyor" in the document), where the conveyance device stops and harvesting operations are suspended when a detection value from the detection sensor reaches or exceeds a predetermined upper limit value.

Additionally, an auger of a harvester continuously feeds out culm which has been harvested. Thus if the drive state of the auger deteriorates, not only can harvesting operations not be carried out correctly, but the auger will also be damaged. For example, if the harvested culm becomes caught in the auger, a heavy load will act on the auger shaft, which is a drive shaft through which drive power from the engine is transmitted. Thus in the combine according to Patent Document 3, the auger shaft is provided with a spring-type torque limiter. If the auger becomes clogged with harvested culm and a torque exceeding a limit torque acts on the torque limiter, the torque limiter will spin idly so that the transmission of engine power is cut off from the auger shaft. This makes it possible to avoid a situation where a large load acts on the drive shaft.

PRIOR ART DOCUMENTS

Patent Documents

Patent Document 1: JP 2014-183800A
Patent Document 2: JP 2017-35017A
Patent Document 3: JP 2014-33670A

DISCLOSURE OF THE INVENTION

Problems the Invention is to Solve

With the harvester according to Patent Document 2, the conveyance device may become clogged with harvested culm or the like. If the conveyance device becomes clogged, it is necessary for an operator to suspend the work by the harvester and carry out tasks for unclogging the conveyance device.

If the operator is proficient with operating the harvester, he or she can sense that the conveyance device is clogged from sounds, vibrations, or the like produced by the harvester when the conveyance device is clogged.

However, an inexperienced operator will have difficulty sensing that the conveyance device is clogged from sounds, vibrations, or the like produced by the harvester when such a clog has occurred.

Furthermore, depending on the operating environment, there are cases where even a proficient operator will have difficulty recognizing sounds, vibrations, or the like produced by the harvester. For example, the operator may have difficulty recognizing sounds, vibrations, or the like produced by the harvester when the wind is blowing, when there are loud noises in the periphery of the field, and so on.

Furthermore, the conveyance device in the harvester disclosed in Patent Document 1 conveys the whole culm of the harvested crop toward the rear of the harvester, and thus depending on the culm length of the harvested crop, it is conceivable that an unbalanced load could act on the conveyance device. The detection sensor in the harvester disclosed in Patent Document 1 is configured to detect a load on the conveyance device. It is therefore conceivable that if the harvested crop puts an unbalanced load on the conveyance device, the conveyance device will be stopped due to an erroneous detection despite the drive state of the conveyance device actually being normal, which risks complicating the harvesting operations.

Further still, when avoiding loads by using a torque limiter, it is difficult to set the limit torque. If the limit torque is increased, the torque limiter will not spin idly until a large load acts on the auger shaft. Conversely, if the limit torque is reduced, the torque limiter will spin idly in response to even a slight culm clog that could be cleared quickly, which reduces the efficiency of the harvesting operations.

To solve the aforementioned problems, an object of the present invention is to appropriately determine clogs caused by harvested crops in a conveyance device, an auger, and the like.

Means to Solve the Problems

A harvester according to one embodiment of the present invention is a harvester capable of autonomous travel in a field, the harvester including: a harvesting unit that harvests a crop from the field; a conveyance device that conveys, toward the rear of a harvester body, a whole culm of the harvested crop harvested by the harvesting unit; a detection sensor that detects a drive speed of the conveyance device; and a clog determining unit that determines a clog of the harvested crop in the conveyance device on the basis of the drive speed, wherein the clog determining unit outputs a vehicle stop command that stops the harvester body when the drive speed becomes lower than a pre-set first threshold during the autonomous travel.

According to this configuration, the determination of a harvested crop clog in the conveyance device is made on the basis of the actual drive speed of the conveyance device. Accordingly, even if the harvested crop places an unbalanced load on the conveyance device, as long as the drive speed of the conveyance device has not decreased, the harvested crop is conveyed normally to the rear, which makes it difficult for the conveyance device to stop due to an erroneous detection. Accordingly, a harvested crop clog in the conveyance device can be appropriately determined without erroneous detections, and a harvester capable of carrying out appropriate processing when a clog arises can be implemented.

Preferably, a second threshold set higher than the first threshold is provided; and when the drive speed becomes a value between the first threshold and the second threshold, the clog determining unit outputs a speed reduction command that reduces a vehicle speed of the harvester body in stages, in accordance with a magnitude of the drive speed.

Even if a clog has occurred due to the harvested crop becoming entangled in the conveyance device or a large amount of the harvested crop flowing into the conveyance device, it may be possible to clear the clog of the harvested crop by reducing the amount of harvested crop input to the conveyance device so that the harvested crop untangles or is more gradually conveyed. According to this configuration, outputting the speed reduction command makes it possible to reduce the vehicle speed in stages; the reduction in vehicle speed reduces the amount of the harvested crop input to the conveyance device, and the harvested crop clog is cleared efficiently.

Preferably, the harvester further includes a travel mode managing unit capable of switching a travel mode to an autonomous travel mode in which the autonomous travel is executed and to a manual travel mode in which manual travel is executed, wherein the travel mode managing unit switches the travel mode to the manual travel mode when the vehicle stop command has been output by the clog determining unit.

When a harvested crop clog arises during autonomous travel, the harvested crop can no longer be continuously conveyed by the conveyance device, and as a result, the autonomous travel cannot be continued as well. According to this configuration, the autonomous travel mode is canceled according to the harvested crop clog determination, and thus the autonomous travel can be suspended as appropriate. Note that the manual travel mode in the present invention is not limited to a mode in which the harvester is operated manually, and includes a mode indicating an abnormal state, a mode indicating a state of preparations for manual operations, and so on. Manual operation of the harvester need not be permitted in the mode indicating an abnormal state, a state of preparations, and so on.

Preferably, the harvester further includes: a travel mode managing unit capable of switching a travel mode to an autonomous travel mode in which the autonomous travel is executed and to a manual travel mode in which manual travel is executed; and a notification unit capable of making a notification indicating that the drive speed has decreased, wherein when the drive speed becomes lower than the first threshold while the travel mode is the autonomous travel mode, the clog determining unit outputs the vehicle stop command, and outputs, to the notification unit, a notification command for making a notification of the decrease in the drive speed, and when the drive speed becomes lower than the first threshold while the travel mode is the manual travel mode, the clog determining unit outputs the notification command to the notification unit without outputting the vehicle stop command.

Having the harvester body stop each time a harvested crop clog is determined risks annoying the driver. According to this configuration, when a harvested crop clog is determined while in the manual travel mode, the vehicle stop command is not output, and thus the driver can continue driving the harvester. Additionally, the notification command is output to the notification unit while in the manual travel mode, and thus the driver can take measures to clear the harvested crop clog on the basis of manual operations, having recognized the harvested crop clog.

Furthermore, a harvester according to one embodiment of the present invention includes: a harvesting unit that harvests a harvested crop from a field; and a conveyance device that conveys the harvested crop harvested by the harvesting unit, wherein the conveyance device includes a conveyor chain, a conveyor screw, or both; and the harvester further includes: a speed obtaining unit that obtains rotational speed information, the rotational speed information being information indicating a rotational speed of the conveyor chain or the conveyor screw; and a clog determining unit that determines whether or not the conveyance device is clogged on the basis of the rotational speed information obtained by the speed obtaining unit.

When the conveyance device is clogged, it is easy for the rotational speed of the conveyor chain or the conveyor screw to drop to zero or an extremely slow speed. Here, according to this configuration, whether or not the conveyance device is clogged is determined on the basis of the rotational speed information. Thus according to this configuration, whether or not the conveyance device is clogged can be determined with a high level of accuracy.

Furthermore, according to this configuration, when the conveyance device is clogged, the clog determining unit can determine that the conveyance device is clogged. Accordingly, when the conveyance device is determined to be clogged, processing is executed in response to that determination result, such as notifying an operator that the conveyance device is clogged, stopping the travel of the harvester, and so on. This makes it possible to implement a configuration in which clogs in the conveyance device can be recognized easily regardless of the operator's level of experience, the operating environment, and so on.

In other words, according to this configuration, a configuration can be implemented in which it is easy to recognize clogs in the conveyance device, regardless of the operator's level of experience, the operating environment, and so on.

Preferably, the conveyance device includes a rotating body that rotationally drives the conveyor chain or the conveyor screw; the rotational speed information is a rotational speed of the rotating body; and the clog determining unit determines that the conveyance device is clogged when the rotational speed of the rotating body obtained by the speed obtaining unit is less than or equal to a prescribed rotational speed.

As described above, when the conveyance device is clogged, it is easy for the rotational speed of the conveyor chain or the conveyor screw to drop to zero or an extremely slow speed. Accordingly, in a harvester including a clog determining unit that determines whether or not the conveyance device is clogged, using a configuration in which the conveyance device is determined to be clogged when the rotational speed of the conveyor chain or the conveyor screw is relatively slow makes it possible to determine a clog in the conveyance device with a high level of accuracy.

Here, according to the above-described configuration, the rotational speed of the rotating body corresponds to the rotational speed of the conveyor chain or the conveyor screw. The conveyance device is determined to be clogged when the rotational speed of the rotating body is less than or equal to a prescribed rotational speed.

In other words, according to the above-described configuration, a configuration in which the conveyance device is determined to be clogged when the rotational speed of the conveyor chain or the conveyor screw is relatively slow can be implemented. This makes it possible to determine conveyance device clogs with a high level of accuracy.

Preferably, the harvester further includes a clog instance control unit that stops travel or reduces a travel speed when the clog determining unit has determined that the conveyance device is clogged.

According to this configuration, when the conveyance device is clogged, the travel of the harvester is stopped, or the speed of the harvester is reduced. Accordingly, the operator can recognize that the conveyance device is clogged on the basis of the travel of the harvester stopping or the speed of the harvester decreasing, regardless of the operator's level of experience, the operating environment, and so on.

Thus according to this configuration, the operator can reliably recognize clogs in the conveyance device, regardless of the operator's level of experience, the operating environment, and so on.

Additionally, as described above, if the conveyance device becomes clogged, it is necessary for an operator to suspend the work by the harvester and carry out tasks for unclogging the conveyance device.

According to the above-described configuration, when the conveyance device is clogged, the travel of the harvester is stopped, or the speed of the harvester is reduced. This makes it easy for the operator to smoothly start operations for clearing the clog from the conveyance device.

Preferably, the conveyance device includes a rotating body that rotationally drives the conveyor chain or the conveyor screw; the rotational speed information is a rotational speed of the rotating body, and the harvester further includes: a first determining unit that determines whether or not the rotational speed of the rotating body is less than or equal to a prescribed first speed; and a deceleration control unit that reduces the travel speed when the first determining unit has determined that the rotational speed of the rotating body is less than or equal to the first speed, wherein the clog determining unit is configured to determine that the conveyance device is clogged when the rotational speed of the rotating body obtained by the speed obtaining unit is less than or equal to a prescribed second speed slower than the first speed; and the clog instance control unit stops travel when the clog determining unit has determined that the conveyance device is clogged.

According to this configuration, the travel speed of the harvester is reduced at the point in time when the rotational speed of the rotating body has dropped to less than or equal to the first speed. The travel of the harvester is stopped when the rotational speed of the rotating body has dropped further to less than or equal to the second speed. Accordingly, the operator can know the degree to which the rotational speed of the rotating body has dropped.

Furthermore, if the rotational speed of the rotating body drops to less than or equal to the first speed but does not drop to less than or equal to the second speed, and instead returns to a speed faster than the first speed, the travel of the harvester is not stopped. This makes it easier for the harvester to continue traveling, compared to a configuration in which the travel of the harvester stops at the point in time when the rotational speed of the rotating body has become less than or equal to the first speed. This makes it possible to avoid a situation where the work efficiency drops due to the travel of the harvester stopping frequently.

Furthermore, a harvester according to one embodiment of the present invention includes: an engine; a harvesting unit including a cutting device that cuts planted culm in a field and an auger that is driven by power from the engine and feeds the harvested culm laterally in a lateral width direction of a harvester body; a conveyance device that conveys the harvested culm to toward the rear of the harvester body; a threshing device that receives the harvested culm conveyed by the conveyance device and carries out a threshing process; a rotation speed detection sensor that detects a rotation speed of the auger; and an auger state determining unit that determines a drive abnormality in the auger on the basis of a detection signal from the rotation speed detection sensor.

According to this configuration, the rotation speed of the auger is detected by the rotation speed detection sensor, and the drive state of the auger is checked using the auger state determining unit. Accordingly, it can be determined that a load is acting on the auger when the rotation speed of the auger has decreased, for example. Furthermore, if the rotation speed suddenly drops to zero, it can be determined that a problem has occurred in the power transmission path from the engine to the auger. Determining a drive abnormality in the auger in this manner makes it possible to carry out processing for handling the drive abnormality.

A drop in the rotation speed of the auger is usually caused by a clog of harvested culm which has become entangled in the auger and therefore cannot be passed to the conveyance device. Thus according to one preferred embodiment of the present invention, the auger state determining unit is configured to determine a clog in the auger on the basis of a drop in the rotation speed of the auger. In other words, it can be determined that the load on the auger has increased, i.e., that the auger has become clogged, on the basis of the decrease in the rotation speed detected by the rotation speed detection sensor.

An auger clog is determined on the basis of the rotation speed of the auger dropping to less than or equal to a pre-set threshold. However, if the rotation speed of the engine is variable and the engine rotation speed is proportional to the rotation speed of the auger, the rotation speed of the auger will decrease if the engine rotation speed decreases, even if the auger is not clogged. In order to avoid a situation where this caused an erroneous determination of an auger clog, the clog can be determined using a decrease in the rotation speed of the auger in comparison with the rotation speed of the engine, i.e., the decrease in the ratio of the engine rotation speed to the auger rotation speed (rate of decrease; the decrease in the rotation speed of the auger normalized according to the rotation speed of the engine). Thus according to one preferred embodiment of the present invention, the auger state determining unit determines a clog in the auger on the basis of a rate of decrease in the rotation speed of the auger relative to a rotation speed of the engine.

Even if the harvested culm becomes entangled in the auger and a clog occurs, if the amount of harvested culm entering the auger decreases, the harvested culm may become untangled and the clog may be cleared. Reducing the vehicle speed is one way to reduce the amount of harvested culm entering the auger. Thus according to one preferred embodiment of the present invention, the auger state determining unit is configured to reduce the vehicle speed when the auger state determining unit has determined that there is a clog. Note that when the planted culms are densely packed locally, the harvested culm entering the auger may temporarily increase, and the harvested culm may become clogged in the auger. In such a case, the amount of harvested culm that enter the auger returns to the original level when the dense planted culm area has passed, so it is highly likely that the clog will clear. In light of this, processes for handling the clog, such as reducing the vehicle speed, may be delayed for some time after a clog has been determined.

If, after a clog has been determined and the vehicle speed has been reduced to handle the clog, the clog is not cleared and the rotation speed of the auger remains low, a high load remains acting on the auger. To avoid such a situation, according to one preferred embodiment of the present invention, the configuration is such that a vehicle body is stopped when a clog has continued for a set amount of time.

After a clog has been determined, the driver will become anxious if a process for handling the clog, such as reducing the vehicle speed, is executed suddenly. Additionally, a decrease in the rotation speed of the auger negatively affects the harvesting operations, and it is therefore important to notify the driver thereof. Thus according to one preferred embodiment of the present invention, the configuration is such that when the auger state determining unit has determined the drive abnormality, a drive abnormality warning is made.

BEST MODE FOR CARRYING OUT THE INVENTION

First Embodiment

Figure 1:
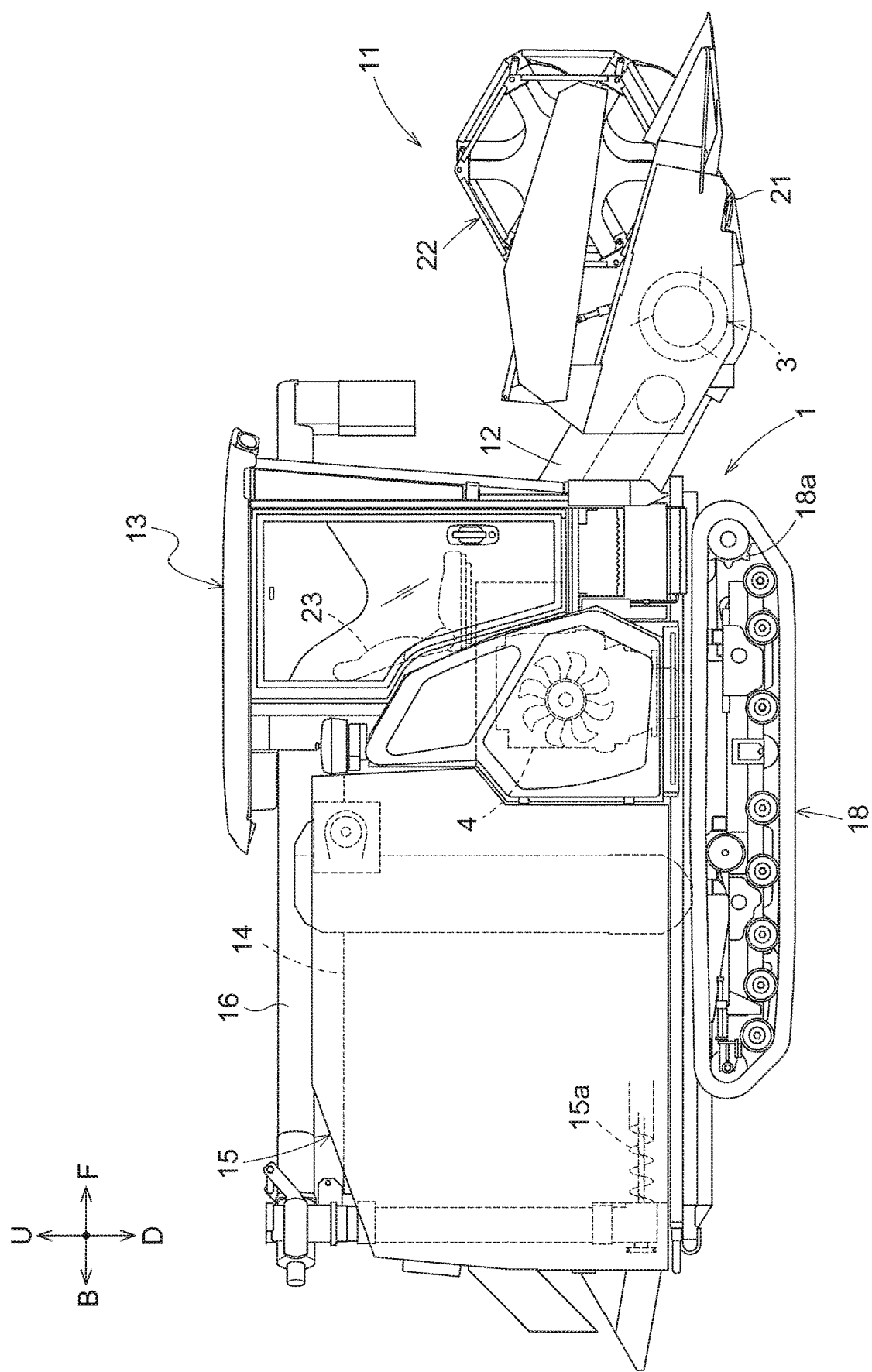
FIG. 1 is a right-side view of a combine according to a first embodiment.
Figure 2:
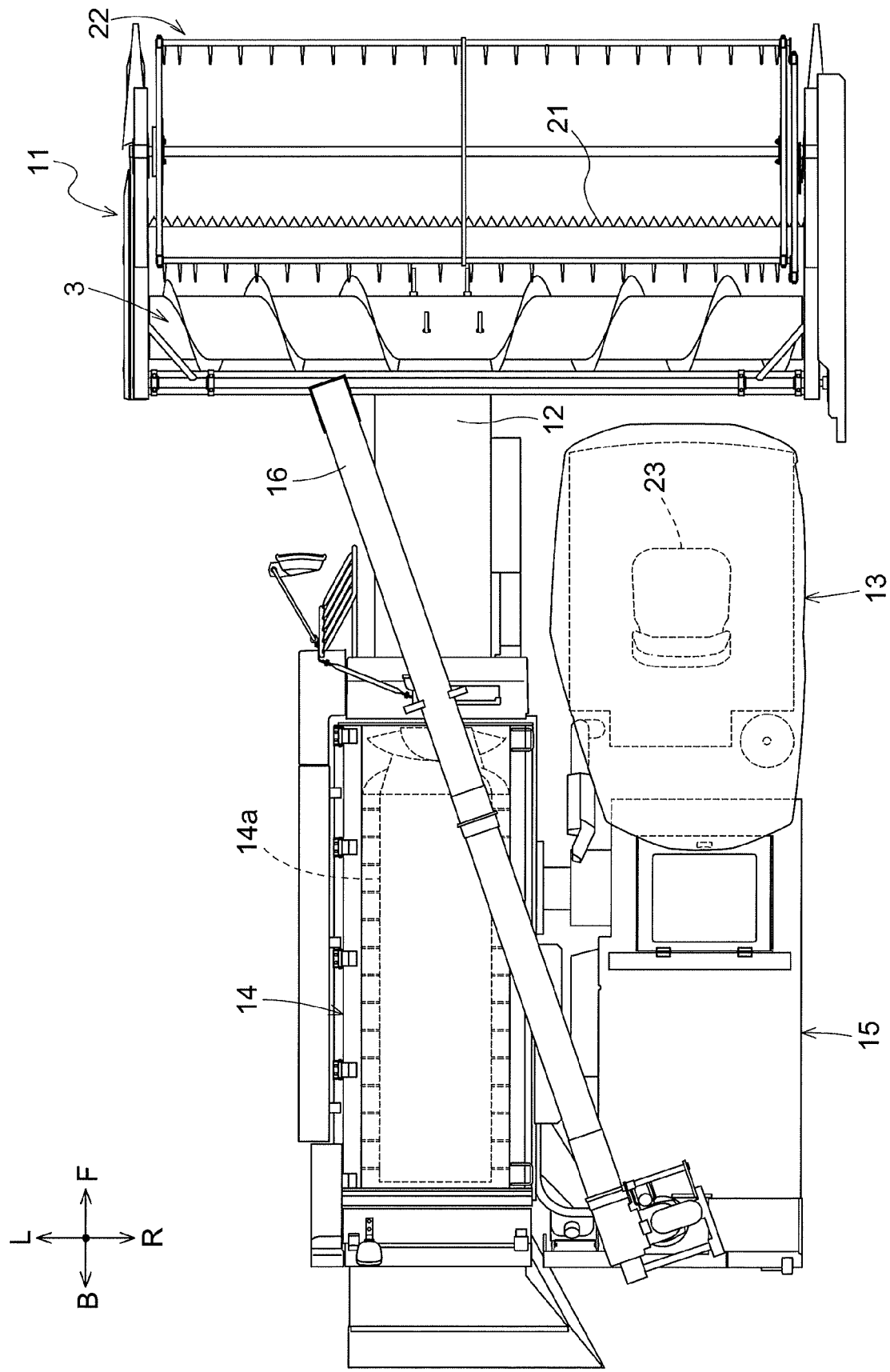
FIG. 2 is a plan view of the combine according to the first embodiment.

Embodiments for carrying out the present invention will be described on the basis of the drawings. Note that unless otherwise specified, in the following descriptions, the direction indicated by an arrow F in FIGS. 1 and 2 is assumed to be "forward", and the direction indicated by an arrow B is assumed to be "backward". "Forward" refers to the forward direction with respect to a front-back direction (travel direction) of a harvester body, whereas "backward" refers to the backward direction with respect to the front-back direction (travel direction) of the harvester body. Additionally, the direction indicated by an arrow U in FIG. 1 is assumed to be "up", and the direction indicated by an arrow D is assumed to be "down". "Up" and "down" represent a positional relationship with respect to the vertical direction of the harvester body, and indicate a relationship in terms of the height from the ground. Furthermore, the direction indicated by an arrow L in FIG. 2 is assumed to be "left", and the direction indicated by an arrow R is assumed to be "right". A left-right direction is also called a "horizontal direction", and refers to a latitudinal direction of the harvester body (a width direction of the harvester body) orthogonal to the front-back direction of the harvester body.

One specific embodiment of a harvester according to the present invention will be described next. FIG. 1 is a side view of a standard combine serving as an example of the harvester, and FIG. 2 is a plan view of the same. The combine includes a harvesting unit 11, serving as a harvesting unit; a conveyance device 12; a cabin 13; a threshing device 14; a grain tank 15; and a grain discharge device 16. The harvesting unit 11 harvests a crop from a field. The harvesting unit 11 includes a cutting device 21 that harvests planted culm as a crop from the field, a reel 22, and an auger 3 that feeds the harvested culm laterally in a lateral width direction of the harvester body. The threshing device 14 is located to the rear of the conveyance device 12. The grain tank 15 is located to the right of the threshing device 14.

The harvesting unit 11 is located on the front side of a vehicle body 1 of the combine, and harvests the planted culm of the field using the cutting device 21. The harvested culm is transferred by the auger 3 in the latitudinal direction of the harvester body, to the front of the conveyance device 12, and is raked into the conveyance device 12. The conveyance device 12 conveys the whole culm of the harvested culm, serving as a harvested crop, toward the rear of the harvester body and feeds the culm into the threshing device 14. The threshing device 14 carries out a threshing process on the harvested culm which has been received. Grain obtained from the threshing process is collected in the grain tank 15. The grain held in the grain tank 15 is discharged to the exterior of the machine by the grain discharge device 16 as necessary.

The combine includes a crawler-type travel device 18. Furthermore, an engine 4 is disposed below a driver's seat 23, which is disposed in a driving area formed within the cabin 13. The travel device 18 is driven by power from the engine 4. The vehicle body 1 of the combine can travel with the support of the travel device 18.

Figure 3:
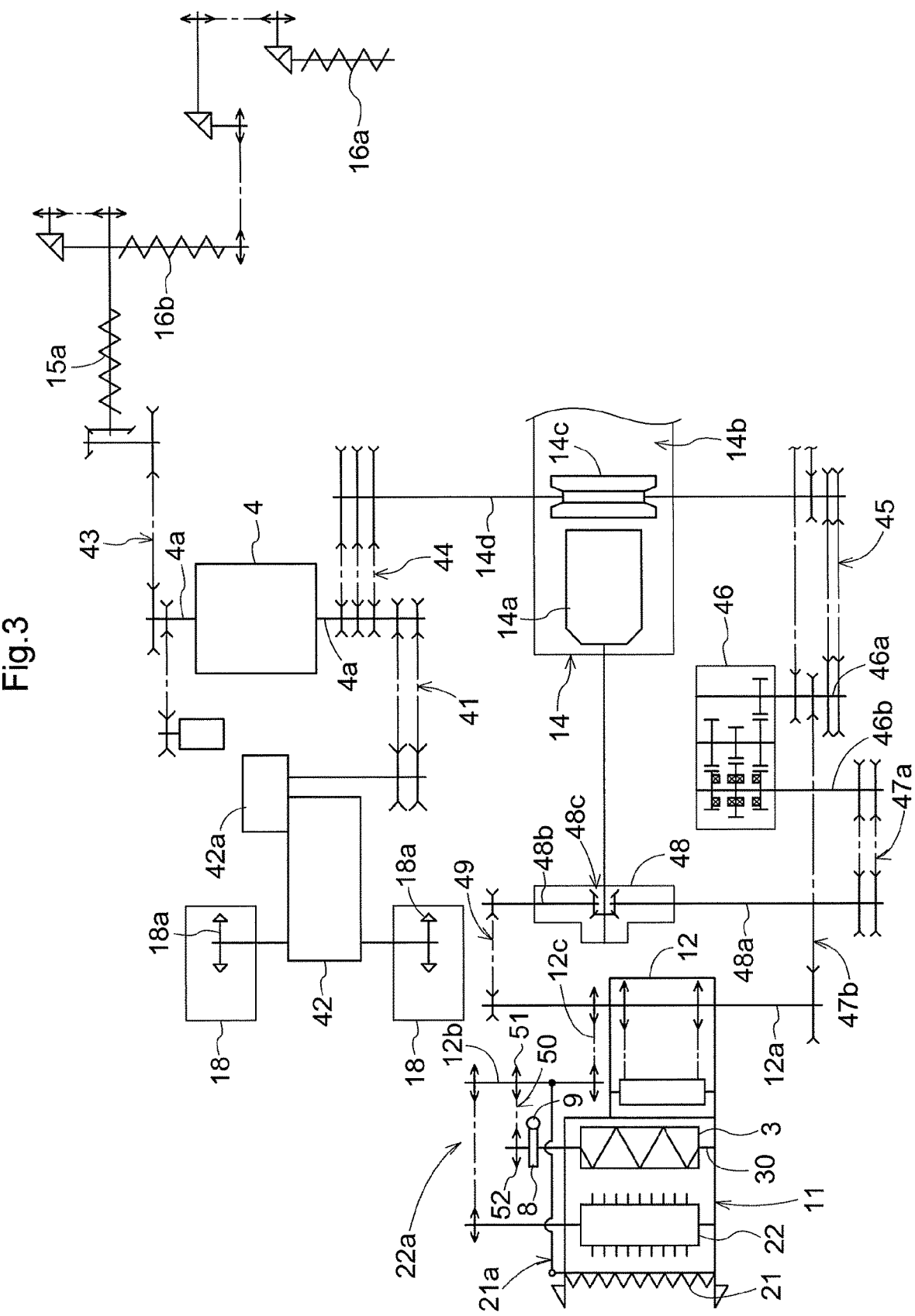
FIG. 3 is a power transmission diagram illustrating a powertrain of the combine according to the first embodiment.

FIG. 3 illustrates a powertrain of the combine. As illustrated in FIG. 3, power from the engine 4 is transmitted to the travel device 18 and an operation device. The operation device includes the harvesting unit 11, which itself includes the auger 3; a threshing cylinder 14a and a sorting unit 14b of the threshing device 14; and the like.

Power from an output shaft 4a of the engine 4 is input to a transmission 42 via a belt transmission mechanism 41, and is output from the transmission 42 to left and right drive wheels 18a of the travel device 18. In the transmission 42, power from the engine 4 is input to a hydrostatic continuously-variable transmission unit 42a, and the power shifted by the hydrostatic continuously-variable transmission unit 42a is transmitted to a distribution transmission (not shown) via an auxiliary transmission unit (not shown), and is output from the distribution transmission to the right and left drive wheels 18a.

The power from the output shaft 4a of the engine 4 is transmitted to a base screw 15a of the grain tank 15 (see FIG. 1) via a belt transmission mechanism 43, and is transmitted from the base screw 15a to a vertical conveyor unit 16b and a horizontal conveyor unit 16a of the grain discharge device 16 (see FIG. 1).

The power from the output shaft 4a of the engine 4 is transmitted via a belt transmission mechanism 44 to a rotary bearing shaft 14d of a winnower 14c in the sorting unit 14b, and the power is transmitted from the rotary bearing shaft 14d to an input shaft 46a of a threshing cylinder transmission device 46 via a belt transmission mechanism 45. Power from an output shaft 46b of the threshing cylinder transmission device 46 is transmitted to an input shaft 48a of a threshing cylinder drive case 48 via a belt transmission mechanism 47a. The threshing cylinder transmission device 46 has a function for shifting among three speeds, namely high, medium, and low.

A belt transmission mechanism 47b for forward rotation transmission is provided across the input shaft 46a of the threshing cylinder transmission device 46 and one side end part of a drive shaft 12a of the conveyance device 12. A belt transmission mechanism 49 for reverse rotation transmission is provided across a reverse output shaft 48b of the threshing cylinder drive case 48 and another side end part of the drive shaft 12a of the conveyance device 12. The reverse output shaft 48b is coupled with the input shaft 48a via a bevel gear mechanism 48c, and is driven in a rotation direction opposite from the rotation direction of the input shaft 48a.

When the belt transmission mechanism 47b for forward rotation transmission is operated toward a tensioned side to switch to a transmitting state, and the belt transmission mechanism 49 for reverse rotation transmission is operated toward a slack side to switch to a non-transmitting state, the power from the input shaft 46a is transmitted through the belt transmission mechanism 47b for forward rotation transmission to the drive shaft 12a of the conveyance device 12, and the conveyance device 12 is driven in a conveyance rotation direction. At this time, the conveyance device 12 is driven at a constant rotation speed (when the rotation speed of the engine 4 is constant) regardless of the speed imparted on the threshing cylinder 14a by the threshing cylinder transmission device 46. When the belt transmission mechanism 47b for forward rotation transmission is operated toward a slack side to switch to a non-transmitting state, and the belt transmission mechanism 49 for reverse rotation transmission is operated toward a tensioned side to switch to a transmitting state, the power from the output shaft 46b of the threshing cylinder transmission device 46 is transmitted through the bevel gear mechanism 48c and the reverse output shaft 48b of the threshing cylinder drive case 48, and the belt transmission mechanism 49 for reverse rotation transmission, to the drive shaft 12a of the conveyance device 12. As a result, the conveyance device 12 is driven in a rotation direction opposite from the conveyance rotation direction, and the conveyance device 12 carries out reverse conveyance.

The power transmitted to the drive shaft 12a of the conveyance device 12 is transmitted, via a relay transmission mechanism 12c, to a relay shaft 12b supported on a rear part of the right side of the harvesting unit 11. The power transmitted to the relay shaft 12b is transmitted to an auger shaft 30, which is a drive shaft of the auger 3, via an auger power transmission mechanism 50. Furthermore, the power transmitted to the relay shaft 12b is transmitted to the cutting device 21 via a cutting device power transmission mechanism 21a, and to the reel 22 via a reel power transmission mechanism 22a.

Figure 4:
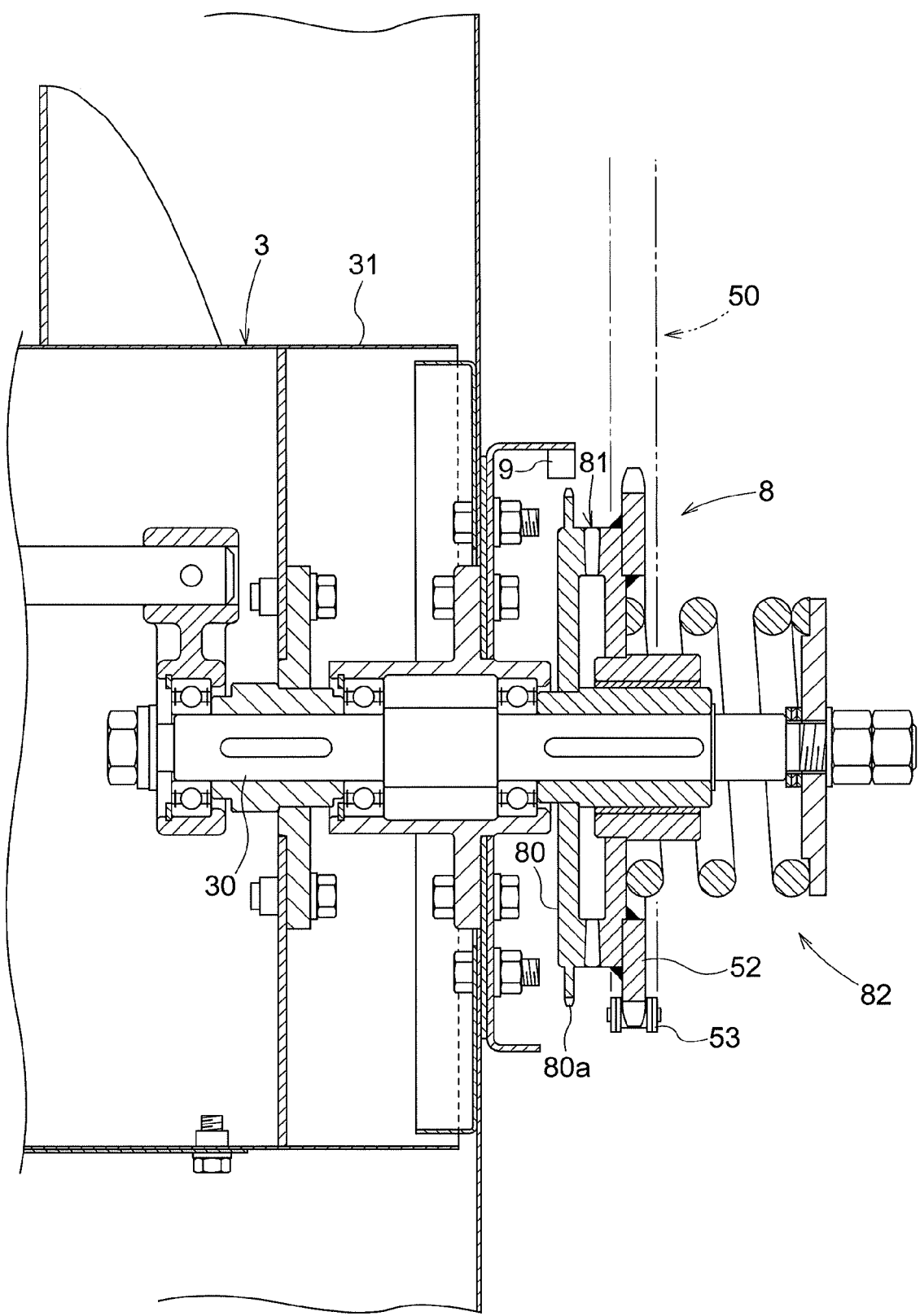
FIG. 4 is a longitudinal cross-sectional rear view illustrating a torque limiter and a rotation speed detection sensor provided in an auger according to the first embodiment.

FIG. 4 illustrates a torque limiter 8 provided on the auger shaft 30, and an auger rotation speed detection sensor 9 that detects a rotation speed of the auger shaft 30 as a rotation speed of the auger 3.

As illustrated in FIG. 3 and FIG. 4, the auger power transmission mechanism 50 includes a drive sprocket 51, a slave sprocket 52, and an endless rotary chain 53. The drive sprocket 51 is provided on the relay shaft 12b, and the slave sprocket 52 is provided on the auger shaft 30, which rotates integrally with an auger drum 31 of the auger 3. The endless rotary chain 53, which is used for auger driving, is wound by the drive sprocket 51 and the slave sprocket 52. The harvested culm moves in the latitudinal direction of the harvester body in response to the rotation of the auger shaft 30, and is passed to the conveyance device 12.

As illustrated in FIG. 4, the torque limiter 8, which allows relative rotation when imparted with torque greater than or equal to a set value, is provided between the auger power transmission mechanism 50 and the auger shaft 30. The torque limiter 8 is provided so that the slave sprocket 52 surrounds and is capable of relative rotation with respect to the auger shaft 30 of the auger 3. An interlock part 81 is formed, following the direction of the shaft core, between the slave sprocket 52 and an interconnecting member 80 that rotates integrally with the auger shaft 30, and a spring 82 that presses and biases the slave sprocket 52 in the direction of the interlock is provided.

When a load is placed on the auger 3 due to harvested culm being wrapped around the auger 3 or the like, and a torque greater than or equal to the set value acts on the auger shaft 30, the slave sprocket 52 displaces against the biasing force of the spring 82, and the interlock part 81 spins idly. The torque limiter 8 therefore functions so as to release the torque.

The auger rotation speed detection sensor 9 is a magnetic sensor, and detects the rotation speed by magnetically detecting tooth-shaped protrusions 80a provided in an outer circumferential surface of the interconnecting member 80.

Figure 5:
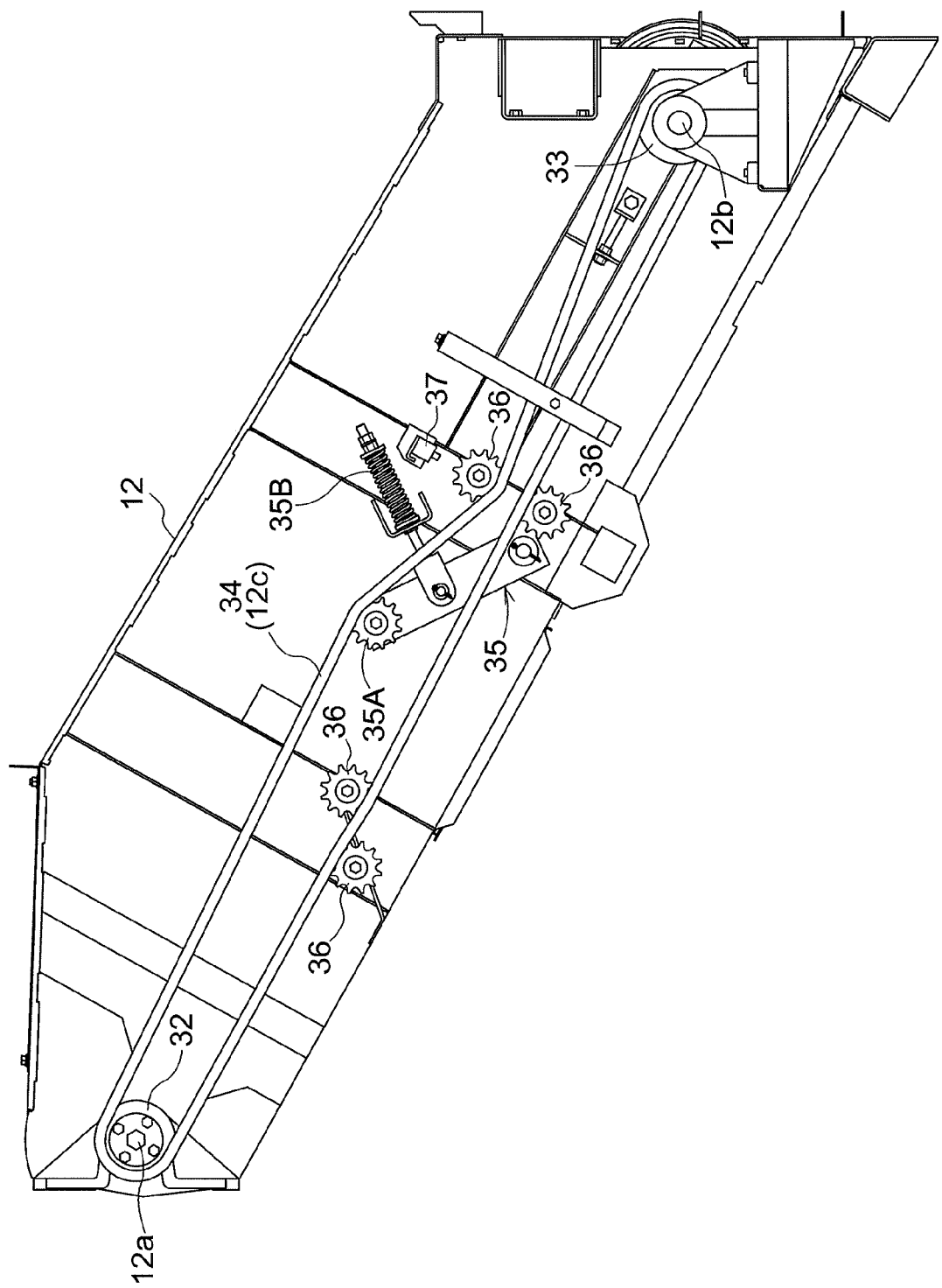
FIG. 5 is a right-side view of a conveyance device according to the first embodiment, illustrating an endless chain for driving the conveyance device.

As illustrated in FIG. 5, the drive shaft 12a is provided with an output sprocket 32, the relay shaft 12b is provided with an input sprocket 33, and an endless chain 34, serving as the relay transmission mechanism 12c, is wound upon the output sprocket 32 and the input sprocket 33. The output sprocket 32, the input sprocket 33, and the endless chain 34 are each provided adjacent to a right-side wall of the conveyance device 12, on the right side of that wall. A tension adjustment mechanism 35 and a plurality of support sprockets 36 are provided between the place where the input sprocket 33 is located and the place where the output sprocket 32 is located. Each of the plurality of support sprockets 36 engages with the endless chain 34. The tension adjustment mechanism 35 is supported on the right-side wall of the conveyance device 12 so as to be capable of pivoting up and down, while being located on an inner circumferential side of the endless chain 34 when seen from the side. A sprocket 35A that engages with the endless chain 34 is provided on a free end part of the tension adjustment mechanism 35. The tension adjustment mechanism 35 is biased by a spring mechanism 35B so as to pivot in the upward direction, and tension acts on the endless chain 34 as a result of the sprocket 35A pressing on the endless chain 34 from the inner circumferential side. Oscillations in the endless chain 34 are suppressed by the support sprockets 36 that engage with the endless chain 34 from the inner circumferential side, and the support sprockets 36 that engage with the endless chain 34 from an outer circumferential side. This reduces the risk of the endless chain 34 elongating due to friction, the endless chain 34 falling off, and so on, and furthermore prevents the risk of unevenness in the rotation speed of the input sprocket 33.

A conveyance rotation speed detection sensor 37 is provided adjacent to one of the plurality of support sprockets 36. The conveyance rotation speed detection sensor 37 is a magnetic sensor, and detects the drive speed of the support sprockets 36 and the endless chain 34, i.e., the rotation speed, by magnetically detecting tooth-shaped protrusions provided in the outer circumferential surface of the support sprockets 36.

Figure 6:
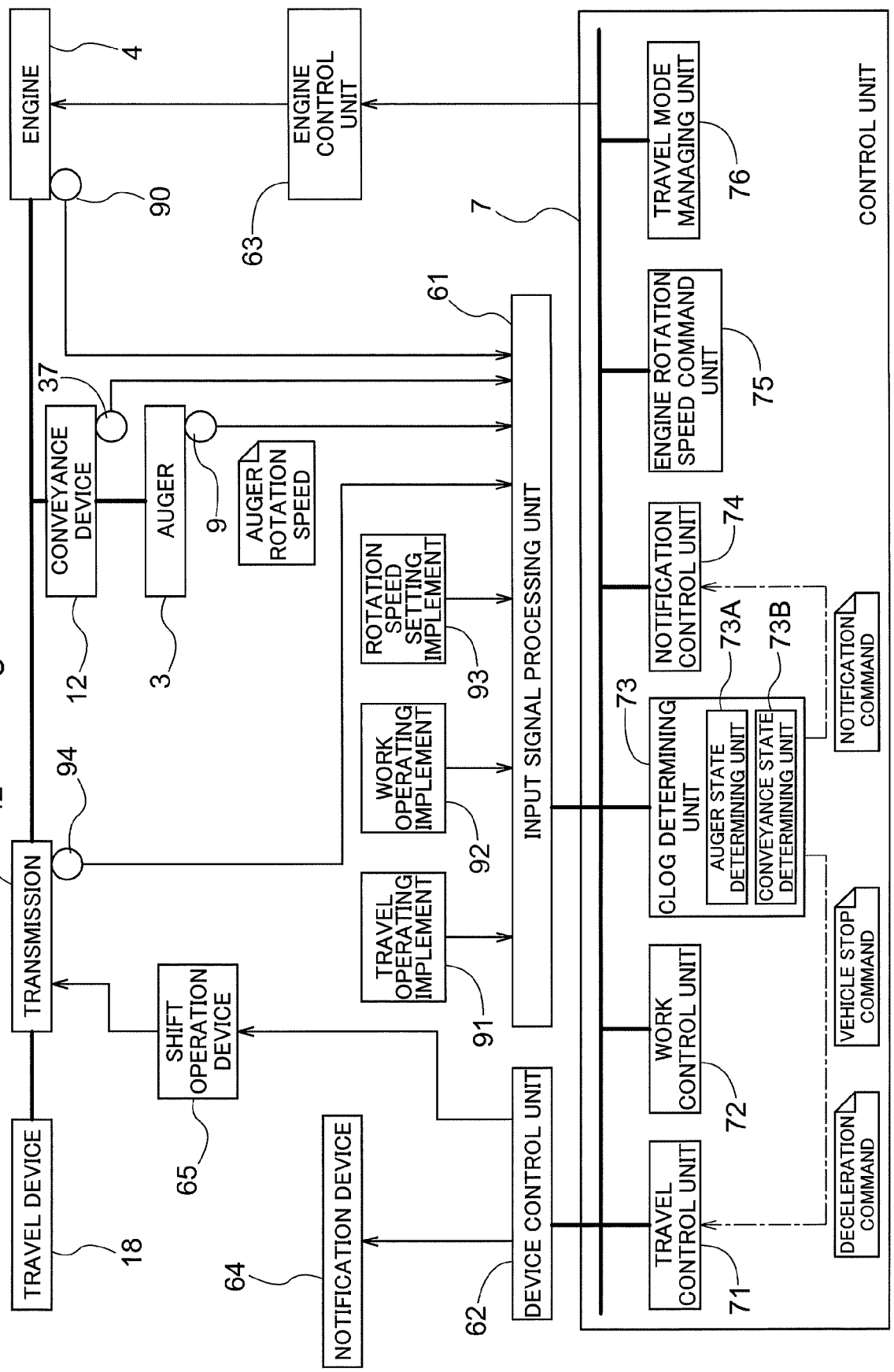
FIG. 6 is a function block diagram illustrating a control system of the combine according to the first embodiment.

The function blocks in FIG. 6 indicate control functions of the auger 3 and the conveyance device 12 in the control system of this combine. Various signals are input to a control unit 7 via an input signal processing unit 61. The control unit 7 controls operational devices by sending various control signals via a device control unit 62. These operational devices include a shift operation device 65, which changes the vehicle speed by adjusting the gear of the transmission 42, as well as various devices incorporated into the operation device. Signals from a travel operating implement 91, a work operating implement 92, and a rotation speed setting implement 93 are input to the input signal processing unit 61. Furthermore, signals from various sensors, switches, and the like, such as the auger rotation speed detection sensor 9 which detects the rotation speed of the auger shaft 30, an engine rotation speed detection sensor 90 which detects the rotation speed of the engine 4, a vehicle speed sensor 94, and the like, are input to the input signal processing unit 61.

The travel operating implement 91 is a collective name for devices used by a driver to operate the operational devices pertaining to travel, and includes a gearshift lever, a steering lever, and the like. The drive speeds of the left and right crawler drive wheels 18a constituting the travel device 18 (see FIG. 1) are adjusted by operating the travel operating implement 91. The travel operating implement 91 may be a multifunction lever having multiple functions, or may be a single-function lever, or may be a combination of the two. The work operating implement 92 is a collective name for devices used by the driver for operating the operation device, and includes a harvester clutch lever, a thresher clutch lever, a discharge lever, and the like. The work operating implement 92 also may be a multifunction lever having multiple functions, or may be a single-function lever, or may be a combination of the two. The rotation speed setting implement 93 is a collective name for an accelerator lever, an accelerator pedal, and accelerator dial, and the like, and is used to adjust and set the engine rotation speed.

An engine control unit 63 drives the engine 4 at a prescribed engine rotation speed or a prescribed torque by adjusting an amount of fuel supplied to the engine 4 and the like on the basis of commands from the control unit 7.

A notification device 64 connected to the device control unit 62 notifies the driver, a supervisor, or the like of various happenings arising in the combine, and is a collective name for a lamp, a buzzer, a speaker, a display, and so on.

The control unit 7 includes a travel control unit 71, a work control unit 72, a clog determining unit 73, a notification control unit 74 serving as a notification unit, an engine rotation speed command unit 75, and a travel mode managing unit 76. The travel control unit 71 outputs a control signal to operate the shift operation device 65 via the device control unit 62, in order to control the driving of the travel device 18. The vehicle speed is adjusted, turns are made in the left-right direction (steering is carried out in the left-right direction), and so on in response to these control signals. The travel mode managing unit 76 is configured to be capable of switching a travel mode of the control unit 7 between an autonomous travel mode in which travel is carried out autonomously and a manual travel mode in which travel is carried out manually. In the autonomous travel mode, the combine travels autonomously while harvesting, along a travel path set in the field.

The work control unit 72 generates control commands for the operation device on the basis of commands from the work operating implement 92, and outputs the control commands to the operation device via the device control unit 62.

The clog determining unit 73 includes an auger state determining unit 73A and a conveyance state determining unit 73B. The auger state determining unit 73A determines drive abnormalities in the auger 3 on the basis of a detection signal from the auger rotation speed detection sensor 9. The conveyance state determining unit 73B determines drive abnormalities in the conveyance device 12 on the basis of a detection signal from the conveyance rotation speed detection sensor 37. In other words, the conveyance state determining unit 73B of the clog determining unit 73 determines clogs of harvested crops in the conveyance device 12 on the basis of the drive speed of the conveyance device 12.

The drive abnormalities of the auger 3 include mechanical malfunctions, such as the chain of the auger power transmission mechanism 50 (see FIG. 4 hereinafter) breaking or coming off, the torque limiter 8 (see FIG. 4 hereinafter) operating, harvested culm becoming clogged and preventing the auger 3 from properly feeding the harvested culm laterally, and so on. Although a malfunction which cuts off mechanical power makes it necessary to suspend operations to fix the malfunction, a harvested culm clog may be able to be cleared naturally, or by reducing the vehicle speed. If harvested culm clogs the auger 3, the torque limiter 8 will operate, and the rotation speed of the auger shaft 30 will drop almost or entirely to zero. As such, the auger state determining unit 73A can determine that there is a clog in the auger 3 on the basis of a drop in the rotation speed of the auger shaft 30 (hereinafter, see FIG. 4).

Note that the rotation speed of the auger 3 depends on the engine rotation speed, and thus the rotation speed of the auger 3 will drop, regardless of whether or not there is a harvested culm clog, when the engine rotation speed is reduced by operating the rotation speed setting implement 93. To avoid such erroneous clog determinations, the auger state determining unit 73A may be configured to determine a clog in the auger 3 by taking a ratio of the rotation speed of the engine 4 to the rotation speed of the auger shaft 30 and using a threshold of that ratio (a rate of decrease; a drop in the auger shaft rotation speed normalized according to the engine rotation speed). Alternatively, the rotation speed of the engine 4 may be sectioned into a plurality of regions, and an auger rotation speed for determining a clog may be set for each of those regions.

The drive abnormalities of the conveyance device 12 include mechanical malfunctions such as the endless chain 34 (see FIG. 5 hereinafter) breaking or coming off, harvested culm clogging inside the conveyance device 12, and so on. Although a malfunction which cuts off mechanical power makes it necessary to suspend operations to fix the malfunction, a harvested culm clog may be able to be cleared naturally, or by reducing the vehicle speed. When the harvested culm clogs within the conveyance device 12, for example, slippage occurs between the belt transmission mechanism 47*b* for forward rotation transmission (see FIG. 3), and the drive shaft 12*a* (see FIG. 3), and the rotation speed of the endless chain 34, the support sprockets 36 (see FIG. 5 hereinafter), or the like drop almost or entirely to zero. As such, the conveyance state determining unit 73B can determine a clog in the conveyance device 12 on the basis of a drop in the rotation speed of the support sprockets 36.

Note that in this embodiment, the rotation speeds of the endless chain 34, the support sprockets 36, and the like depend on the engine rotation speed, and thus the rotation speeds of the endless chain 34, the support sprockets 36, and the like will drop, regardless of whether or not there is a harvested culm clog, when the engine rotation speed is reduced by operating the rotation speed setting implement 93. To avoid such erroneous clog determinations, the conveyance state determining unit 73B may be configured to determine a clog in the conveyance device 12 by taking a ratio of the rotation speed of the engine 4 to the rotation speed of the support sprockets 36 and using a threshold of that ratio (a rate of decrease; a drop in the rotation speed of the support sprockets 36 normalized according to the engine rotation speed). Alternatively, the rotation speed of the engine 4 may be sectioned into a plurality of regions, and a rotation speed of the support sprockets 36 for determining a clog may be set for each of those regions.

Even if a clog has occurred due to the harvested crop becoming entangled in the conveyance device 12 or a large amount of the harvested crop flowing into the conveyance device 12, it may be possible to clear the clog of the harvested crop by reducing the amount of harvested crop input to the conveyance device 12 so that the harvested crop untangles or is more gradually conveyed. In other words, reducing the vehicle speed to reduce the amount of harvested culm fed into the auger 3 or the conveyance device 12 is an effective method for clearing a harvested culm clog. As such, the clog determining unit 73 outputs a speed reduction command for reducing the vehicle speed to the travel control unit 71 when it has been determined that a clog has formed in at least one of the auger 3 and the conveyance device 12. Additionally, if a clog remains in at least one of the auger 3 and the conveyance device 12 for a set amount of time, the clog determining unit 73 outputs a vehicle stop command for stopping the vehicle body 1 to the travel control unit 71 in order to prevent the auger 3 or the conveyance device 12 from being damaged, prevent an engine stall, and so on. This is particularly useful when the auger power transmission mechanism 50 is constituted by a belt transmission mechanism which experiences slippage due to clogs relatively easily, because the rate of decrease in the rotation speed occurring at the time of a clog can have a wide range depending on the severity of the clog.

The clog determining unit 73 outputs a notification command to the notification control unit 74 when it has been determined that a drive abnormality has occurred in at least one of the auger 3 and the conveyance device 12. A notification of a drive abnormality warning is made through the notification device 64 on the basis of this notification command. Accordingly, the notification control unit 74, which serves as the notification unit, can make a notification that the drive speed of the conveyance device 12 has decreased. A clog warning made when a clog has been determined, a vehicle speed decrease notification made when the speed reduction command has been output, a vehicle stop notification made when the vehicle stop command has been output, and so on can be given as examples of the drive abnormality warning.

Figure 7:
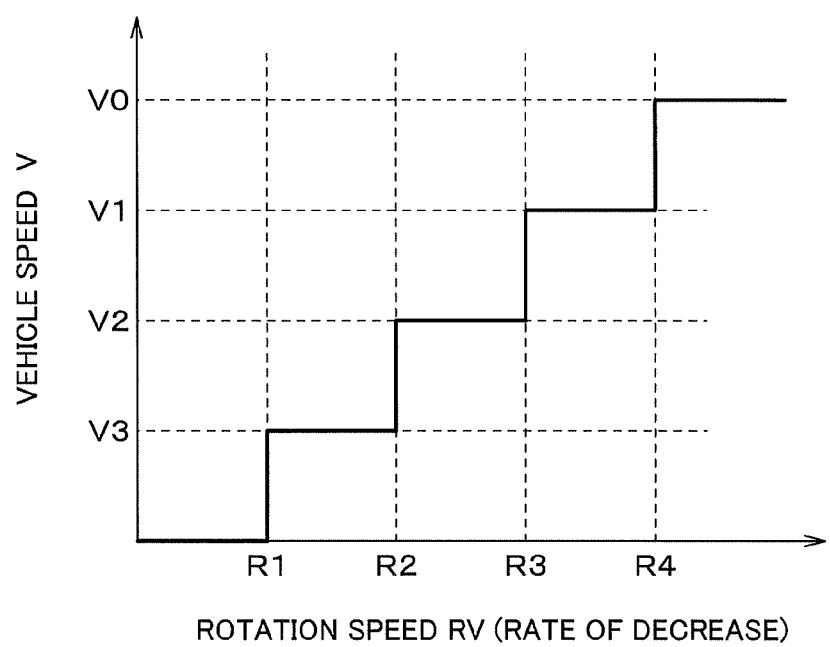
FIG. 7 is a graph illustrating a relationship between driving of the conveyance device and a speed of a vehicle body, according to the first embodiment.

FIG. 7 illustrates an example pertaining to the output of the speed reduction command, the vehicle stop command, and so on by the clog determining unit 73. Although the horizontal axis represents a rotation speed Rv of the support sprockets 36 in FIG. 7, the horizontal axis may instead represent the above-described rate of decrease (a value obtained by dividing the rotation speed Rv by the rotation speed of the engine 4 (see FIG. 6)). The vertical axis in FIG. 7 represents a vehicle speed V of the vehicle body 1. When the rotation speed of the endless chain 34, which is used to rotationally drive a feeder within the conveyance device 12 (see FIG. 6), decreases, the rotation speed Rv of the support sprockets 36 decreases as well. In the present embodiment, a vehicle stop threshold R1 is set as a first threshold, and vehicle speed decrease thresholds R2, R3, and R4 are provided as second thresholds set to be higher than the vehicle stop threshold R1.

Figure 8:
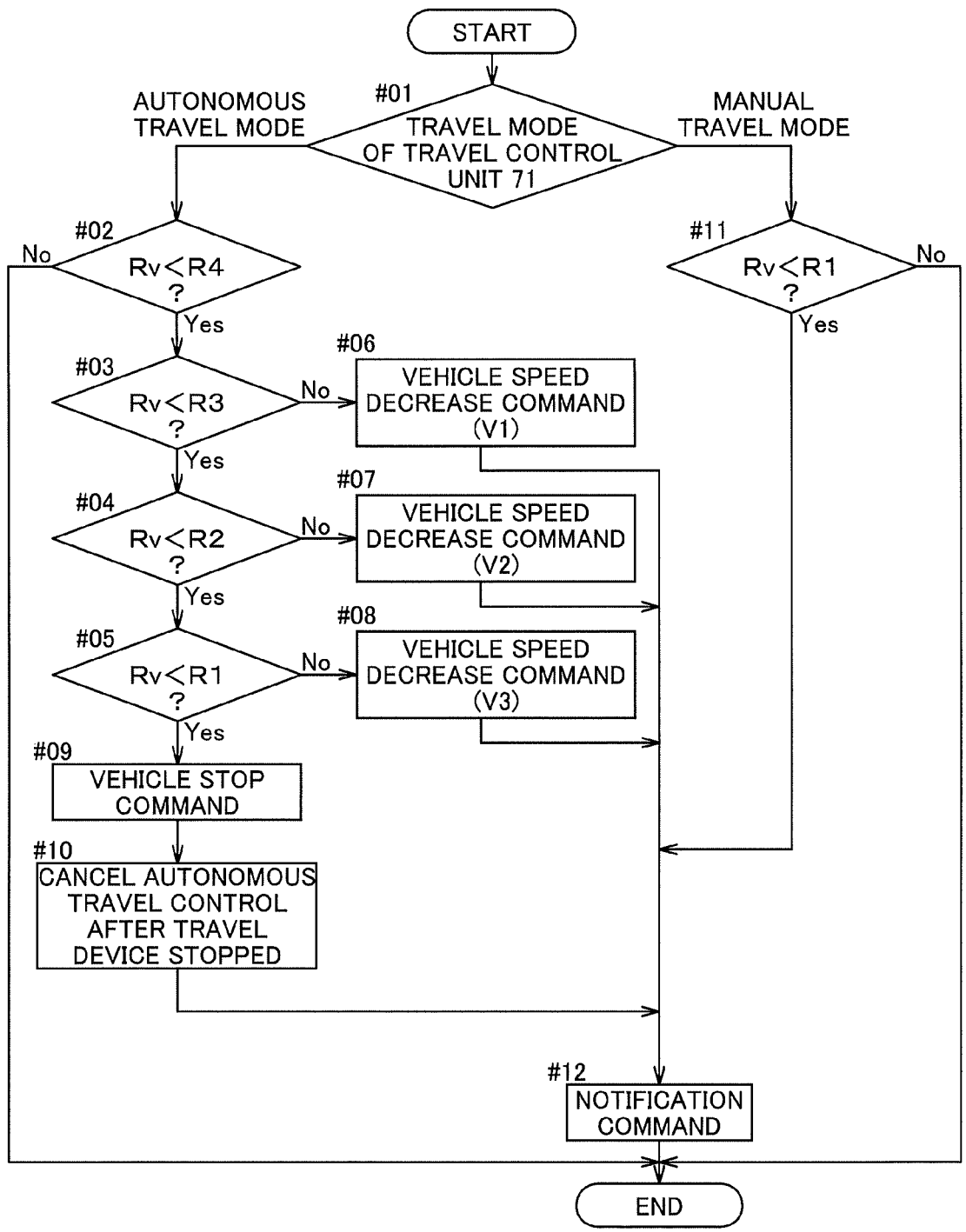
FIG. 8 is a flowchart illustrating the flow of processing for a speed reduction command, a vehicle stop command, and a notification command, carried out by a clog determining unit according to the first embodiment.

The clog determining unit 73 outputs the speed reduction command, the vehicle stop command, and so on when the travel mode of the travel control unit 71 is the autonomous travel mode. Thus as illustrated in FIG. 6 and FIG. 8, the travel mode of the travel control unit 71 is determined through processing by the control unit 7 (step #01). When the travel mode of the travel control unit 71 is the autonomous travel mode ("autonomous travel mode" in step #01), a clog determination is made on the basis of the rotation speed Rv (step #02 to step #05). However, if the rotation speed Rv is higher than (or greater than or equal to) the vehicle speed decrease threshold R4 (step #02: No), the clog determining unit 73 determines that a harvested culm clog is not present in the conveyance device 12. The clog determining unit 73 does not output the speed reduction command, the vehicle stop command, or the like to the travel control unit 71, and the travel control unit 71 controls the driving of the travel device 18 so that the vehicle speed V of the vehicle body 1 is an original work vehicle speed V0.

However, if the rotation speed Rv is lower than (or less than or equal to) the vehicle speed decrease threshold R4 (step #02; Yes), the clog determining unit 73 determines that a harvested culm clog is present in the conveyance device 12. If the rotation speed Rv is being maintained at higher than (or greater than or equal to) the vehicle stop threshold R1, it is possible that the harvested culm clog will clear naturally or by reducing the vehicle speed. As such, when the drive speed reaches a value between the vehicle stop threshold R1 and the vehicle speed decrease threshold R4, which is set in advance to a value higher than the vehicle stop threshold R1, the clog determining unit 73 outputs the speed reduction command to the travel control unit 71 so as to reduce the vehicle speed V of the vehicle body 1 in stages, in accordance with the rate of the rotation speed Rv, which corresponds to the drive speed of the conveyance device 12.

When the rotation speed Rv is within a range between the vehicle speed decrease threshold R3 and the vehicle speed decrease threshold R4 (step #02; Yes; step #03; No), the clog determining unit 73 outputs the speed reduction command to the travel control unit 71 so that the vehicle speed V of the vehicle body 1 is a first reduced vehicle speed V1, which is lower than the original work vehicle speed V0 (step #06). When the rotation speed Rv is within a range between the vehicle speed decrease threshold R2 and the vehicle speed decrease threshold R3 (step #03: Yes; step #04: No), the clog determining unit 73 outputs the speed reduction command to the travel control unit 71 so that the vehicle speed V of the vehicle body 1 is a second reduced vehicle speed V2, which is furthermore lower than the first reduced vehicle speed V1 (step #07). When the rotation speed Rv is within a range between the vehicle stop threshold R1 and the vehicle speed decrease threshold R2 (step #04: Yes; step #05: No), the clog determining unit 73 outputs the speed reduction command to the travel control unit 71 so that the vehicle speed V of the vehicle body 1 is a third reduced vehicle speed V3, which is furthermore lower than the second reduced vehicle speed V2 (step #08).

When the rotation speed Rv is lower (or less than or equal to) the vehicle stop threshold R1 (step #05: Yes), the clog determining unit 73 outputs the vehicle stop command to the travel control unit 71 (step #09). As a result, the travel device 18 stops, and the vehicle body 1 stops as well. The travel mode managing unit 76 switches the travel mode to the manual travel mode when the vehicle stop command is output by the clog determining unit 73 (step #10).

After any one of the processes from step #06 to step #09 has been carried out, the clog determining unit 73 outputs the notification command to the notification control unit 74 (step #12). Additionally, when the travel mode of the travel control unit 71 is the manual travel mode (step #01: "manual travel mode") and the rotation speed Rv is lower than (or less than or equal to) the vehicle stop threshold R1 (step #11: Yes), the clog determining unit 73 outputs the notification command to the notification control unit 74 (step #12). In this manner, when the rotation speed Rv is lower than the vehicle stop threshold R1 while the travel mode is the autonomous travel mode, the clog determining unit 73 outputs the vehicle stop command, and furthermore outputs the notification command to the notification control unit 74 to make a notification than the rotation speed Rv has decreased. Furthermore, when the rotation speed Rv is lower than the vehicle stop threshold R1 while the travel mode is the manual travel mode, the clog determining unit 73 outputs the notification command to the notification control unit 74 without outputting the vehicle stop command.

Figure 9:
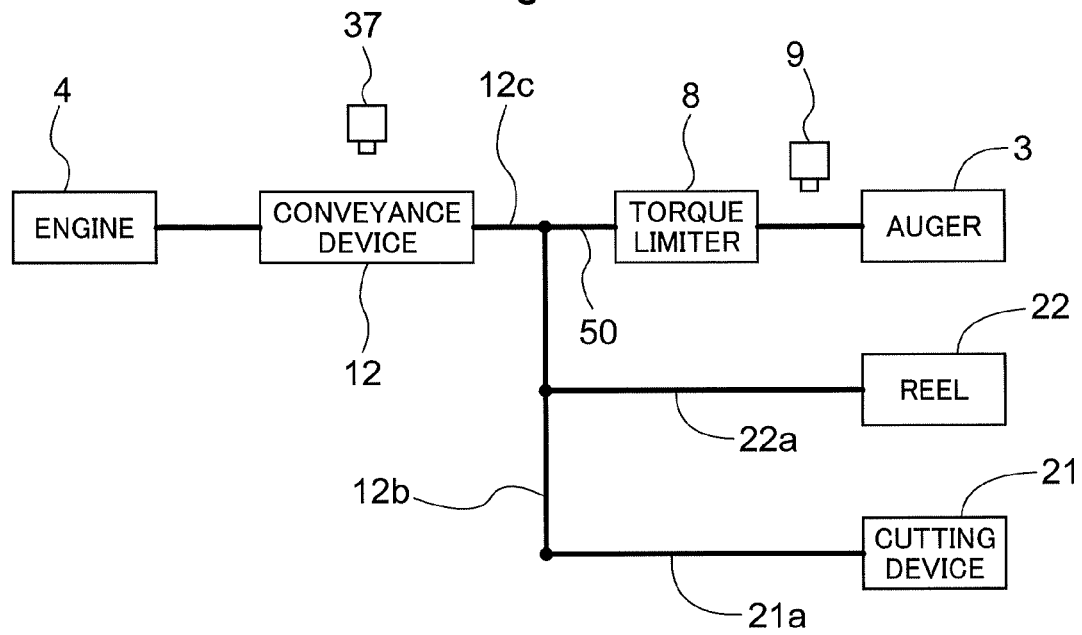
FIG. 9 is a schematic diagram illustrating the transmission of power from an engine to the conveyance device, the auger, a reel, and so on, according to the first embodiment.

The schematic diagram in FIG. 9 illustrates a path through which engine power is transmitted to the conveyance device 12, the auger 3, the reel 22, and the cutting device 21. The power transmitted to the conveyance device 12 is transmitted to the relay shaft 12*b* via the relay transmission mechanism 12*c*, and is then distributed among the auger 3, the reel 22, and the cutting device 21 from the relay shaft 12*b*. In this power transmission path, it is easy for the harvested culm to clog in the conveyance device 12 and the auger 3.

If a clog arises in the auger 3, the rotation speed detected by the auger rotation speed detection sensor 9 will drop.

The auger state determining unit 73A then determines that a clog has arisen in the auger 3, and a notification is made by the notification device 64. If at this time the rotation speed detected by the conveyance rotation speed detection sensor 37 does not drop and the conveyance state determining unit 73B does not determine that a clog has arisen in the conveyance device 12, the driver, an administrator, or the like can determine that the clog has arisen only in the auger 3.

If a clog arises in the conveyance device 12, the rotation speed detected by the conveyance rotation speed detection sensor 37 will drop. At this time, the rotation speed of the endless chain 34, i.e., the relay transmission mechanism 12*c*, will drop almost or entirely to zero. As a result, rotational power from the engine 4 will no longer be transmitted to the auger shaft 30, which is further on terminal side than the relay shaft 12*b*, and thus the auger 3 will also be unable to rotate. Thus the rotation speed detected by the auger rotation speed detection sensor 9 drops in tandem with the drop in the rotation speed detected by the conveyance rotation speed detection sensor 37. The auger state determining unit 73A determines that a clog has arisen in the auger 3, and furthermore, the conveyance state determining unit 73B determines that a clog has arisen in the conveyance device 12. A notification is then made by the notification device 64. In this case, the driver, the administrator, or the like can determine that a clog has arisen only in the conveyance device 12, or that a clog has arisen in both the conveyance device 12 and the auger 3. The driver, the administrator, or the like can therefore take action, such as running the conveyance device 12 in reverse, as a measure for clearing the clog in the conveyance device 12, the auger 3, or the like.

Additionally, by observing the movement of the reel 22, which is visible from the driver's seat, the driver can determine whether a clog has arisen in the auger 3, the conveyance device 12, or both. The reel 22 rotating correctly indicates that the conveyance device 12 is rotating normally, and thus the driver can determine that a clog has arisen only in the auger 3. If the reel 22 is not rotating, however, the driver can determine that a clog has arisen only in the conveyance device 12, or that a clog has arisen in both the conveyance device 12 and the auger 3.

Variations on First Embodiment (1) In the foregoing embodiment, the conveyance rotation speed detection sensor 37 is constituted by a magnetic sensor that magnetically detects tooth-shaped protrusions provided in the outer circumferential surface of the support sprockets 36. However, various other rotation speed detection sensors commonly used (optical sensors and the like) may be used instead.

(2) In the foregoing embodiment, the conveyance rotation speed detection sensor 37, which detects the rotation speed of the support sprockets 36, is used to detect the drive speed of the conveyance device 12. However, the configuration is not limited to this embodiment. For example, a sensor that detects the rotation of a member aside from the aside support sprockets 36, but which rotates at a rotation speed corresponding to the drive speed of the conveyance device 12, e.g., the output sprocket 32, the input sprocket 33, or the like, may be used as the conveyance rotation speed detection sensor 37. Furthermore, the configuration may be such that a mark which can be detected by the conveyance rotation speed detection sensor 37 is provided in one place on the endless chain 34 and the conveyance rotation speed detection sensor 37 detects a number of rotation pulses from the mark.

(3) In the foregoing embodiment, the clog determining unit 73 includes the auger state determining unit 73A and the conveyance state determining unit 73B. However, the auger state determining unit 73A need not be included.

(4) The conveyance state determining unit 73B may calculate a deceleration rate so that the vehicle speed drops according to the rate of decrease in the drive speed of the conveyance device 12, and output the speed reduction command on the basis of this deceleration rate.

(5) In the foregoing embodiment, the travel mode managing unit 76 is configured to be capable of switching to the autonomous travel mode and to the manual travel mode. However, the travel modes are not limited to the autonomous travel mode and the manual travel mode. For example, the configuration may be such that when the travel mode managing unit 76 switches from the autonomous travel mode to the manual travel mode, the travel mode managing unit 76 first switches to a manual preparation mode, and then switches to the manual travel mode once a condition for manual travel has been met. Additionally, the configuration may be such that the travel mode managing unit 76 switches from the autonomous travel mode to an abnormal mode when it has been determined that there is a harvested crop clog during automated travel.

(6) In the foregoing embodiment, the three vehicle speed decrease thresholds R2, R3, and R4 are provided as the second thresholds. However, there may be only one second threshold, or a plurality (e.g., two or four), instead.

(7) In the foregoing embodiment, the auger rotation speed detection sensor 9 is constituted by a magnetic sensor that magnetically detects the tooth-shaped protrusions 80a. However, various other rotation speed detection sensors commonly used (optical sensors and the like) may be used instead.

(8) In the foregoing embodiment, the auger rotation speed detection sensor 9, which detects the rotation speed of the auger shaft 30, is used to detect the rotation speed of the auger 3. However, a sensor that detects rotation of a member aside from the auger shaft 30 but which rotates at a rotation speed corresponding to the rotation speed of the auger 3, e.g., the auger drum 31, may be used as the auger rotation speed detection sensor 9.

(9) The auger state determining unit 73A may reduce the vehicle speed at a deceleration rate calculated in accordance with the rate of decrease of the auger rotation speed.

Note that the configurations disclosed in the foregoing embodiment (including the variations; the same applies hereinafter) can be applied in combination with the configurations disclosed in other embodiments as long as no inconsistencies arise as a result. Furthermore, the embodiments disclosed in this specification are merely examples. The embodiments of the present invention are not limited to these embodiments, and can be changed as appropriate within a scope that does not depart from the object of the present invention.

Second Embodiment

Figure 10:
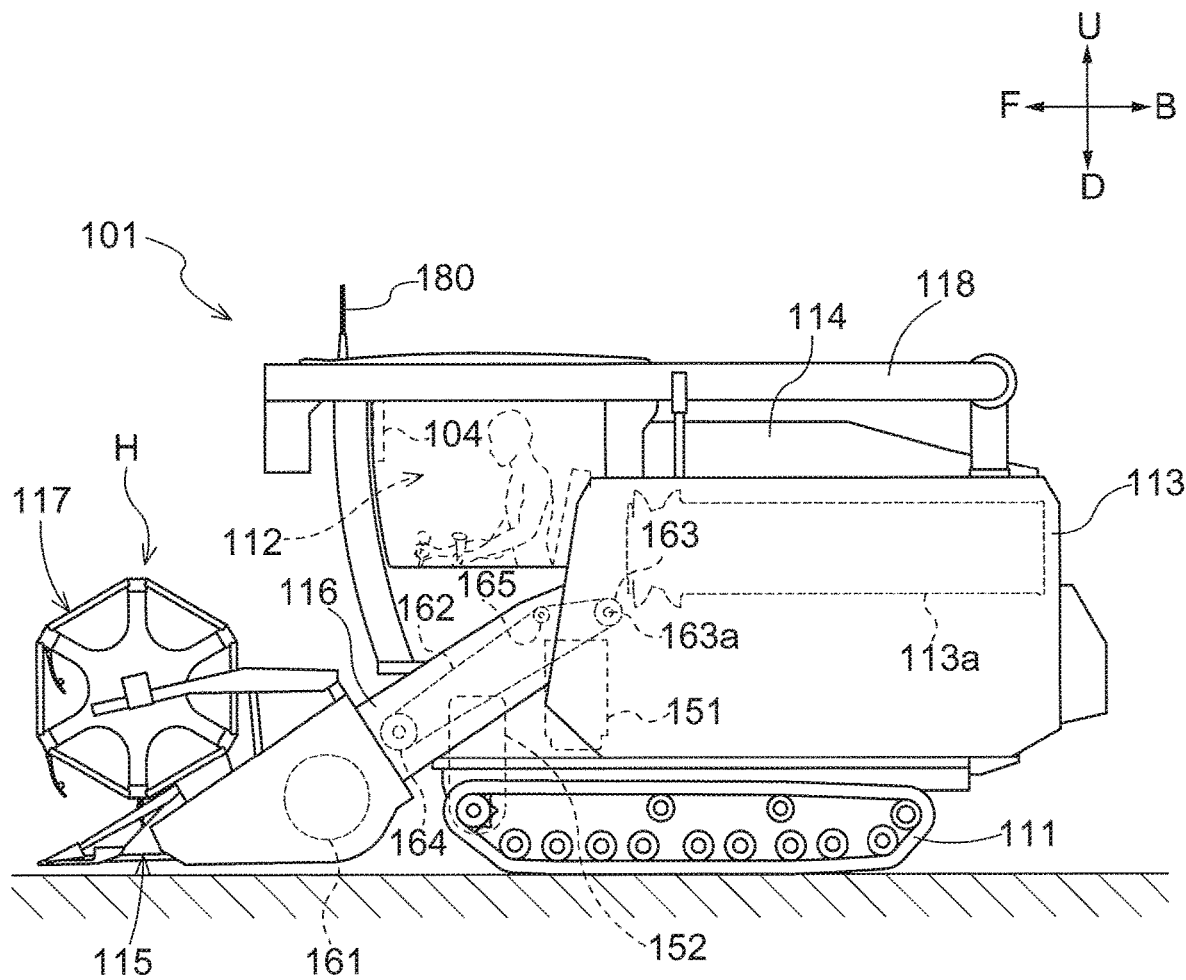
FIG. 10 is a left-side view of a combine according to a second embodiment.

A second embodiment for carrying out the present invention will be described with reference to the drawings. Note that in the following descriptions, the direction indicated by the arrow F in FIG. 10 is assumed to be "forward", and the direction indicated by the arrow B is assumed to be "backward". Additionally, the direction indicated by an arrow U in FIG. 10 is assumed to be "up", and the direction indicated by an arrow D is assumed to be "down".

Overall Configuration of Combine

Figure 11:
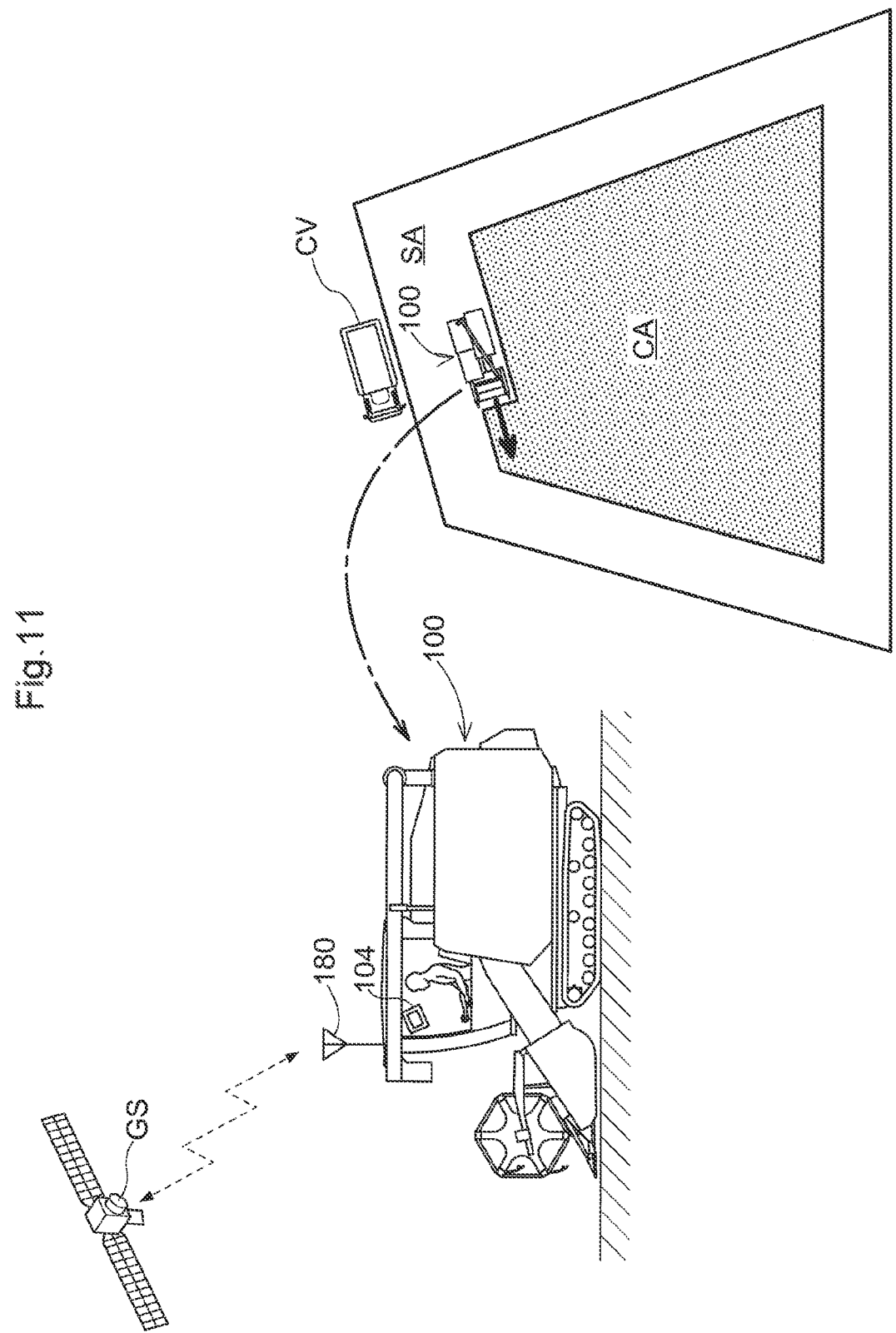
FIG. 11 is a diagram illustrating an overview of autonomous travel by the combine according to the second embodiment.

As illustrated in FIG. 10 and FIG. 11, a standard combine 101 (corresponding to a "harvester" according to the present invention) includes a crawler-type travel device 111, a operating portion 112, a threshing device 113, a grain tank 114, a harvesting device H (corresponding to a "harvesting unit" according to the present invention), a conveyance device 116, a grain discharge device 118, and a satellite positioning module 180. The combine 101 also includes an engine 151 and a transmission device 152.

As illustrated in FIG. 10, the travel device 111 is provided in a lower part of the combine 101. Drive power from the engine 151 is shifted via the transmission device 152 and transmitted to the travel device 111. According to this configuration, the travel device 111 enables the combine 101 to be self-propelled.

The operating portion 112, the threshing device 113, and the grain tank 114 are provided on an upper side of the travel device 111. An operator who monitors the work of the combine 101 can enter into the operating portion 112. Note that the operator may monitor the work of the combine 101 from outside the combine 101.

The grain discharge device 118 is provided on an upper side of the grain tank 114. Additionally, the satellite positioning module 180 is attached to an upper surface of the operating portion 112.

The harvesting device H is provided on a front part of the combine 101. The conveyance device 116 is provided on a rear side of the harvesting device H. The harvesting device H includes a harvesting unit 115 and a reel 117.

The harvesting unit 115 harvests planted culm in a field. The reel 117 rakes the planted culm, which is to be harvested, while being rotationally driven. Through this configuration, the harvesting device H harvests grain from the field. The combine 101 can carry out harvesting travel, in which the combine 101 travels using the travel device 111 while harvesting the grain in the field (corresponding to a "harvested crop" according to the present invention) using the harvesting device H.

In this manner, the combine 101 includes the harvesting device H which harvests the harvested crop from the field.

The harvested culm harvested by the harvesting unit 115 is conveyed to the threshing device 113 by the conveyance device 116. The harvested culm undergoes a threshing process in the threshing device 113. Grain obtained from the threshing process is collected in the grain tank 114. The grain held in the grain tank 114 is discharged to the exterior of the machine by the grain discharge device 118 as necessary.

In this manner, the combine 101 includes the conveyance device 116 that conveys the grain harvested by the harvesting device H.

As illustrated in FIG. 10 and FIG. 11, a communication terminal 104 is provided in the operating portion 112. In the present embodiment, the communication terminal 104 is fixed to the operating portion 112. However, the present invention is not limited to this configuration, and the communication terminal 104 may be configured to be removable from the operating portion 112, or the communication terminal 104 may be located outside the combine 101.

Configuration Related to Autonomous Travel

Figure 12:
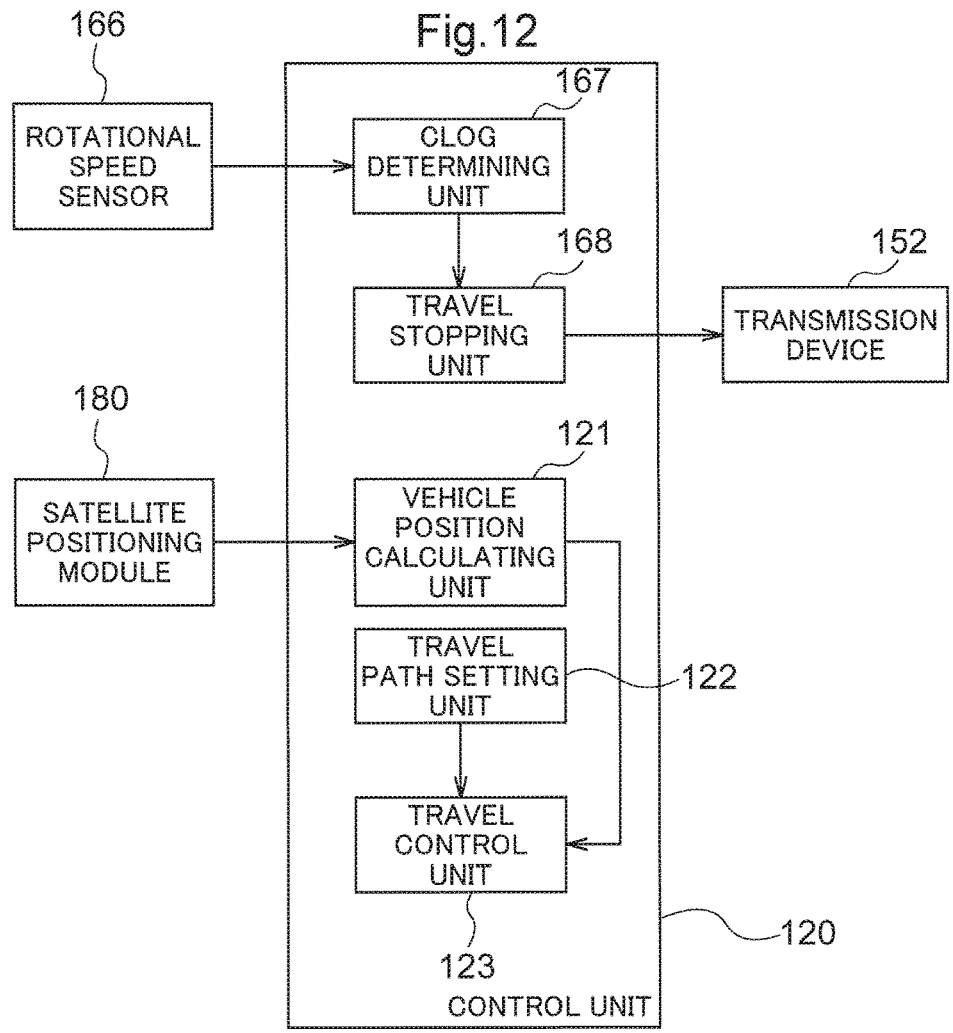
FIG. 12 is a block diagram illustrating configurations pertaining to a control unit according to the second embodiment.

As illustrated in FIG. 12, the combine 101 includes a control unit 120. The control unit 120 includes a vehicle position calculating unit 121, a travel path setting unit 122, and a travel control unit 123.

As illustrated in FIG. 11, the satellite positioning module 180 receives a GPS signal from an artificial satellite GS used in GPS (global positioning systems). As illustrated in FIG. 12, the satellite positioning module 180 sends positioning data to the vehicle position calculating unit 121 on the basis of the received GPS signal.

The vehicle position calculating unit 121 calculates positional coordinates of the combine 101 on the basis of the positioning data received from the satellite positioning module 180. The calculated positional coordinates of the combine 101 are sent to the travel control unit 123.

The travel path setting unit 122 sets a travel path in the field. The set travel path is sent to the travel control unit 123.

The travel control unit 123 controls the travel of the combine 101 on the basis of the positional coordinates of the combine 101 received from the vehicle position calculating unit 121 and the travel path received from the travel path setting unit 122. To be more specific, the travel control unit 123 controls the combine 101 to travel along the travel path set by the travel path setting unit 122.

According to the configuration described thus far, the combine 101 according to the present embodiment is configured to be capable of autonomous travel within the field. A procedure performed when the combine 101 carries out harvesting operations in the field will be described next.

First, the operator manually operates the combine 101, and carries out harvesting travel so as to travel along a boundary line of the field in an outer circumferential part within the field, as illustrated in FIG. 11. The region that has become an already-harvested site as a result is set as an outer peripheral region SA. The unharvested region remaining on the inner side of the outer peripheral region SA is set as a region CA to be worked.

At this time, to ensure that the width of the outer peripheral region SA is sufficiently broad, the operator travels for two to three passes (laps) with the combine 101. In this travel, each time the combine 101 makes a single pass (lap), the width of the outer peripheral region SA increases by an amount equivalent to a work width of the combine 101. In other words, once three to four passes (laps) have been made, the width of the outer peripheral region SA is approximately two to three times the width of the work width of the combine 101.

The outer peripheral region SA is used as a space for the combine 101 to change directions during harvesting travel within the region CA to be worked. The outer peripheral region SA is also used as a movement space when pausing the harvesting travel and moving to a grain discharge location, moving to a refueling location, and so on.

A transport vehicle CV illustrated in FIG. 11 can collect and transport the grain discharged from the grain discharge device 118 by the combine 101. When discharging the grain, the combine 101 moves to the vicinity of the transport vehicle CV and discharges the grain into the transport vehicle CV using the grain discharge device 118.

Figure 13:
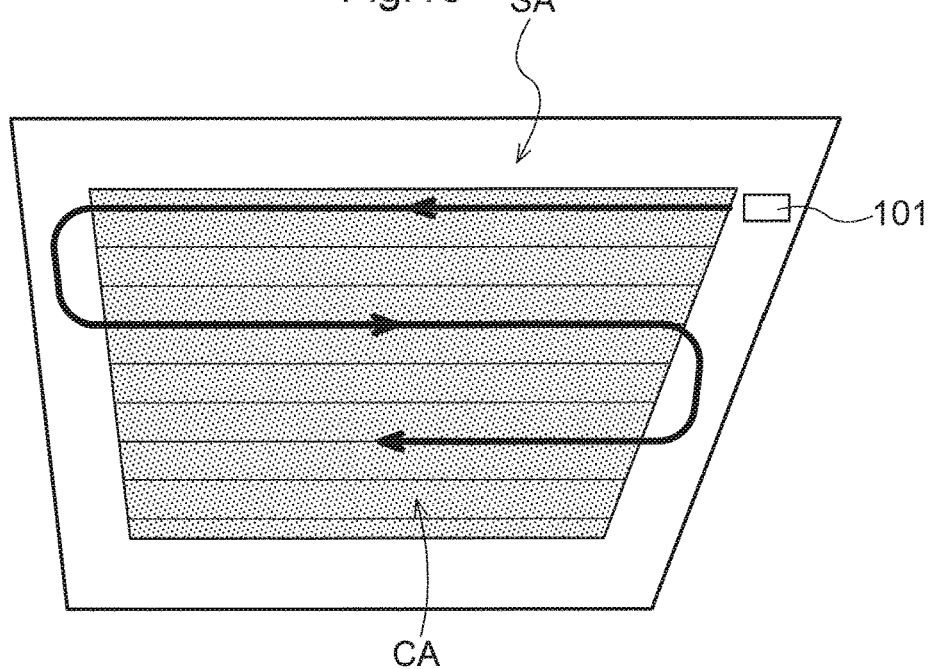
FIG. 13 is a diagram illustrating travel paths in autonomous travel according to the second embodiment.

When the outer peripheral region SA and the region CA to be worked are set, a travel path is set in the region CA to be worked as illustrated in FIG. 13. This travel path is set by the travel path setting unit 122.

Then, once the travel path is set, the combine 101 travels autonomously along the travel path as a result of the travel control unit 123 controlling the travel of the combine 101. As illustrated in FIG. 10 and FIG. 11, the autonomous travel of the combine 101 is monitored by the operator.

Configuration Related to Conveyor Chain

As illustrated in FIG. 10, the combine 101 includes a raking auger 161. The raking auger 161 rakes the harvested culm harvested by the harvesting unit 115 toward the conveyance device 116.

The conveyance device 116 includes a conveyor chain 162, a sprocket 163 (corresponding to a "rotating body" according to the present invention), a slave wheel 164, and a tension wheel 165.

As illustrated in FIG. 10, the sprocket 163 is located at a rear end part of the conveyance device 116. The slave wheel 164 is located at a front end part of the conveyance device 116. The conveyor chain 162 is wound upon the sprocket 163 and the slave wheel 164. The tension wheel 165 applies tension to the conveyor chain 162.

The sprocket 163 is fixed to a drive shaft 163a extending in the left-right direction of the harvester body. Rotational driving force from the engine 151 is transmitted to the drive shaft 163a. According to this configuration, the sprocket 163 is rotated by the rotational driving force from the engine 151. The conveyor chain 162 is rotationally driven by rotational driving force from the sprocket 163.

The slave wheel 164 is configured to be capable of rotating freely about a shaft core following the left-right direction of the harvester body. The slave wheel 164 also rotates along with the rotation of the conveyor chain 162.

The harvested culm raked in by the raking auger 161 is conveyed to a front end part of a threshing cylinder 113a of the threshing device 113 by the rotating conveyor chain 162.

Configuration Related to Clog Determining Unit

As illustrated in FIG. 10 and FIG. 12, the combine 101 includes a rotational speed sensor 166 (corresponding to a "speed obtaining unit" according to the present invention). The control unit 120, meanwhile, includes a clog determining unit 167 and a travel stopping unit 168 (corresponding to a "clog instance control unit" according to the present invention).

The rotational speed sensor 166 is disposed in the vicinity of the sprocket 163. The rotational speed sensor 166 detects the rotational speed of the sprocket 163 over time. Through this configuration, the rotational speed sensor 166 obtains the rotational speed of the sprocket 163. The rotational speed of the sprocket 163 obtained by the rotational speed sensor 166 is sent to the clog determining unit 167.

Note that the rotational speed of the sprocket 163, the rotational speed of the drive shaft 163a, and the rotational speed of the slave wheel 164 are all information indicating the rotational speed of the conveyor chain 162. As such, the rotational speed of the sprocket 163, the rotational speed of the drive shaft 163a, and the rotational speed of the slave wheel 164 all correspond to "rotational speed information" according to the present invention.

In the present embodiment, the rotational speed sensor 166 is configured to obtain the rotational speed of the sprocket 163 as the "rotational speed information" according to the present invention. In other words, in the present embodiment, the "rotational speed information" is the rotational speed of the sprocket 163.

However, the present invention is not limited to this configuration, and the information obtained by the rotational speed sensor 166 may be information aside from the rotational speed of the sprocket 163, as long as it is information indicating the rotational speed of the conveyor chain 162. For example, the rotational speed sensor 166 may be configured to obtain the rotational speed of the drive shaft 163a, or may be configured to obtain the rotational speed of the slave wheel 164. Additionally, the rotational speed sensor 166 may be configured to directly detect and obtain the rotational speed of the conveyor chain 162.

In this manner, the combine 101 includes the rotational speed sensor 166 that obtains the rotational speed of the sprocket 163, which is information indicating the rotational speed of the conveyor chain 162.

The clog determining unit 167 determines whether or not the conveyance device 116 is clogged on the basis of the rotational speed of the sprocket 163 obtained by the rotational speed sensor 166. To be more specific, the clog determining unit 167 determines that the conveyance device 116 is clogged when the rotational speed of the sprocket 163 is less than or equal to a prescribed rotational speed RS. On the other hand, the clog determining unit 167 determines that the conveyance device 116 is not clogged when the rotational speed of the sprocket 163 is greater than or equal to a prescribed rotational speed RS.

A result of the determination by the clog determining unit 167 is sent to the travel stopping unit 168.

In this manner, the combine 101 includes the clog determining unit 167, which determines whether or not the conveyance device 116 is clogged on the basis of the rotational speed of the sprocket 163 obtained by the rotational speed sensor 166. The clog determining unit 167 determines that the conveyance device 116 is clogged when the rotational speed of the sprocket 163 obtained by the rotational speed sensor 166 is less than or equal to the prescribed rotational speed RS.

Note that the prescribed rotational speed RS may be set to a fixed value. Additionally, the prescribed rotational speed RS may be changed according to a condition. For example, the configuration may be such that the prescribed rotational speed RS changes in accordance with the rotational speed of the engine 151. According to this configuration, a configuration can be implemented in which the conveyance device 116 is determined to be clogged when the rotational speed of the sprocket 163 is relatively low despite the rotational speed of the engine 151 satisfying a benchmark for driving the conveyance device 116 normally.

When the clog determining unit 167 has determined that the conveyance device 116 is clogged, the travel stopping unit 168 stops the travel of the combine 101. To be more specific, when the clog determining unit 167 has determined that the conveyance device 116 is clogged, the travel stopping unit 168 controls the transmission device 152 so that the driving of the travel device 111 stops.

Clog Determination Routine

Figure 14:
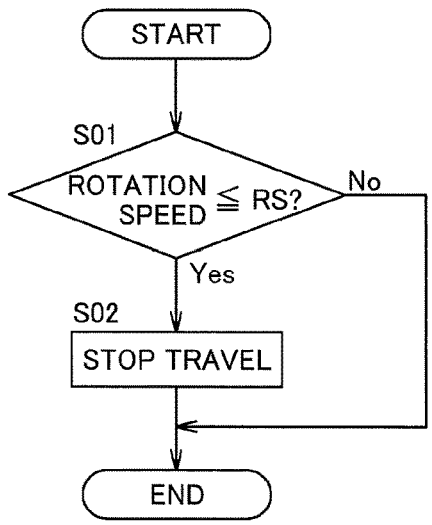
FIG. 14 is a flowchart illustrating a clog determination routine according to the second embodiment.

A clog determination routine, illustrated in FIG. 14, is executed when the combine 101 is traveling. Note that the clog determination routine is stored in the control unit 120.

The clog determination routine illustrated in FIG. 14 will be described hereinafter. When the clog determination routine is executed, first, the process of step S01 is executed. In step S01, the clog determining unit 167 determines whether or not the rotational speed of the sprocket 163 obtained by the rotational speed sensor 166 is less than or equal to the prescribed rotational speed RS.

If the rotational speed of the sprocket 163 is higher than the prescribed rotational speed RS, a determination of "No" is made in step S01, and the clog determination routine ends for the time being.

However, if the rotational speed of the sprocket 163 is less than or equal to the prescribed rotational speed RS, a determination of "Yes" is made in step S01, and the sequence moves to step S02.

In step S02, the driving of the travel device 111 is stopped by the travel stopping unit 168 controlling the transmission device 152. The travel of the combine 101 stops as a result. The clog determination routine then ends for the time being.

When the conveyance device 116 is clogged, it is easy for the rotational speed of the conveyor chain 162 to drop to zero or an extremely slow speed. However, according to the above-described configuration, whether or not the conveyance device 116 is clogged can be determined on the basis of the rotational speed of the sprocket 163. Thus according to the above-described configuration, whether or not the conveyance device 116 is clogged can be determined with a high level of accuracy.

Furthermore, according to the above-described configuration, when the conveyance device 116 is clogged, the clog determining unit 167 can determine that the conveyance device 116 is clogged. Accordingly, when the conveyance device 116 is determined to be clogged, processing is executed in response to that determination result, such as notifying the operator that the conveyance device 116 is clogged, stopping the travel of the combine 101, and so on. This makes it possible to implement a configuration in which clogs in the conveyance device 116 can be recognized easily regardless of the operator's level of experience, the operating environment, and so on.

In other words, according to the above-described configuration, a configuration can be implemented in which it is easy to recognize clogs in the conveyance device 116, regardless of the operator's level of experience, the operating environment, and so on.

First Variation on Second Embodiment

In the foregoing embodiment, the clog determining unit 167 determines that the conveyance device 116 is clogged when the rotational speed of the sprocket 163 is less than or equal to the prescribed rotational speed RS. Then, when the clog determining unit 167 has determined that the conveyance device 116 is clogged, the travel stopping unit 168 stops the travel of the combine 101.

However, the present invention is not limited thereto. A first variation on the second embodiment will be described next, focusing on the differences from the foregoing embodiment. Aside from the parts described below, the configuration is the same as in the foregoing embodiment. Configurations that are the same as in the foregoing embodiment are given the same reference signs.

Figure 15:
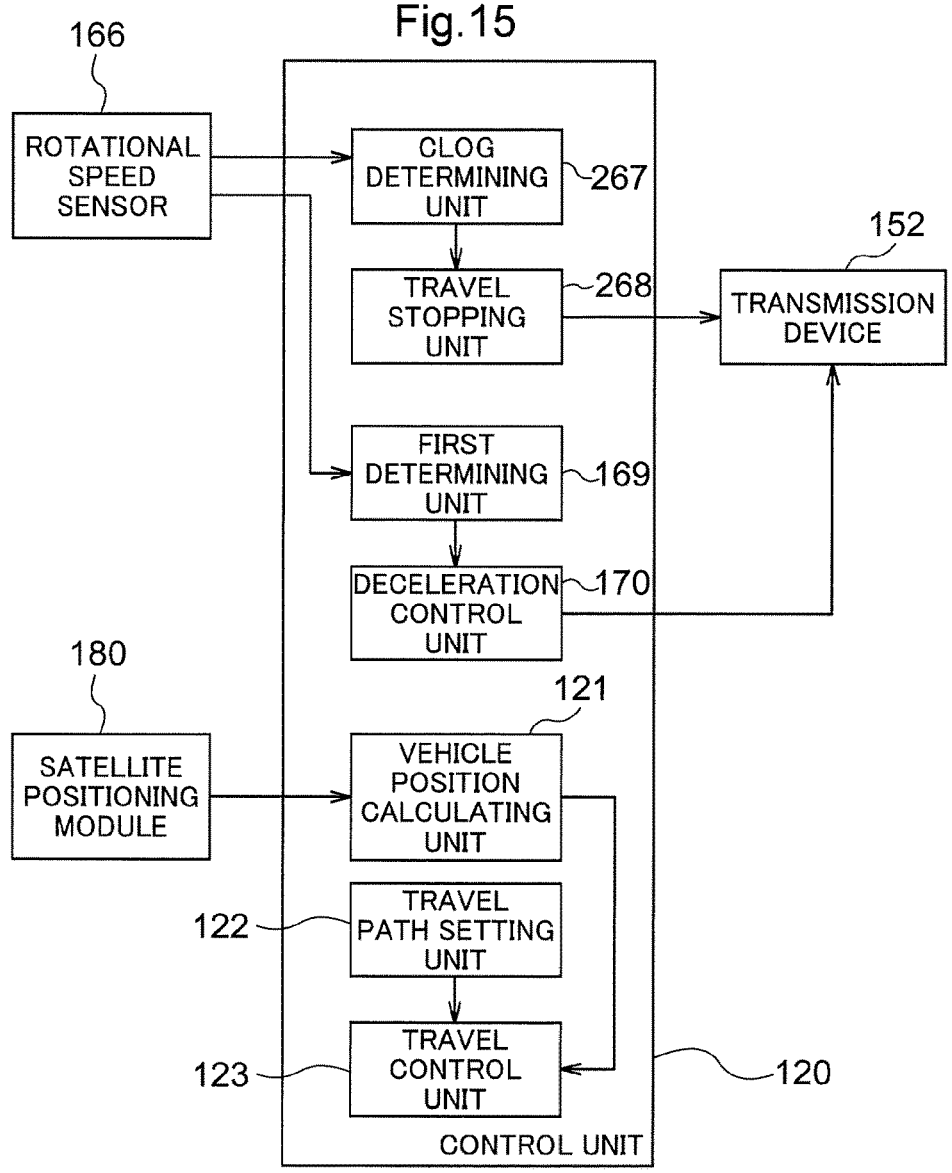
FIG. 15 is a block diagram illustrating configurations pertaining to a control unit according to a first variation on the second embodiment.

FIG. 15 is a diagram illustrating configurations pertaining to the control unit 120 according to the first variation on the second embodiment. In this first variation, the control unit 120 includes a first determining unit 169 and a deceleration control unit 170.

As illustrated in FIG. 15, the rotational speed of the sprocket 163 obtained by the rotational speed sensor 166 is sent to a clog determining unit 267 and the first determining unit 169.

The first determining unit 169 determines whether or not the rotational speed of the sprocket 163 is less than or equal to a prescribed first speed RS1. A result of the determination by the first determining unit 169 is sent to the deceleration control unit 170.

In this manner, the combine 101 includes the first determining unit 169, which determines whether or not the rotational speed of the sprocket 163 is less than or equal to the prescribed first speed RS1.

If the first determining unit 169 has determined that the rotational speed of the sprocket 163 is less than or equal to the first speed RS1, the deceleration control unit 170 reduces the travel speed of the combine 101. To be more specific, if the first determining unit 169 has determined that the rotational speed of the sprocket 163 is less than or equal to the first speed RS1, the deceleration control unit 170 controls the transmission device 152 so that the travel speed of the combine 101 decreases.

In this manner, the combine 101 includes the deceleration control unit 170, which reduces the travel speed when the first determining unit 169 has determined that the rotational speed of the sprocket 163 is less than or equal to the first speed RS1.

Additionally, the clog determining unit 267 determines whether or not the conveyance device 116 is clogged on the basis of the rotational speed of the sprocket 163 obtained by the rotational speed sensor 166. To be more specific, the clog determining unit 267 determines that the conveyance device 116 is clogged when the rotational speed of the sprocket 163 is less than or equal to a prescribed second speed RS2. Additionally, the clog determining unit 267 determines that the conveyance device 116 is not clogged when the rotational speed of the sprocket 163 is higher than the prescribed second speed RS2. Note that the second speed RS2 is a lower speed than the first speed RS1.

A result of the determination by the clog determining unit 267 is sent to a travel stopping unit 268 (corresponding to a "clog instance control unit" according to the present invention).

In this manner, the clog determining unit 267 is configured to determine that the conveyance device 116 is clogged when the rotational speed of the sprocket 163 obtained by the rotational speed sensor 166 is less than or equal to the prescribed second speed RS2, which is lower than the first speed RS1.

Note that the prescribed first speed RS1 and the prescribed second speed RS2 may be set to fixed values. Additionally, the prescribed first speed RS1 and the prescribed second speed RS2 may be changed according to a condition. For example, the configuration may be such that the prescribed first speed RS1 and the prescribed second speed RS2 change in accordance with the rotational speed of the engine 151.

When the clog determining unit 267 has determined that the conveyance device 116 is clogged, the travel stopping unit 268 stops the travel of the combine 101. To be more specific, when the clog determining unit 267 has determined that the conveyance device 116 is clogged, the travel stopping unit 268 controls the transmission device 152 so that the driving of the travel device 111 stops.

In this manner, when the clog determining unit 267 has determined that the conveyance device 116 is clogged, the travel stopping unit 268 stops the travel.

A second deceleration control unit (not shown) may be provided instead of the travel stopping unit 268.

In this configuration, a result of the determination by the clog determining unit 267 is sent to the second deceleration control unit.

When the clog determining unit 267 has determined that the conveyance device 116 is clogged, the second deceleration control unit reduces the travel speed of the combine 101. To be more specific, when the clog determining unit 267 has determined that the conveyance device 116 is clogged, the second deceleration control unit controls the transmission device 152 so that the travel speed of the combine 101 decreases.

In other words, in this configuration, the second deceleration control unit corresponds to a "clog instance control unit" according to the present invention. Additionally, in this configuration, the deceleration control unit 170 reduces the travel speed of the combine 101 when the rotational speed of the sprocket 163 is less than or equal to the first speed RS1. When the rotational speed of the sprocket 163 drops further, to less than or equal to the second speed RS2, the second deceleration control unit further reduces the travel speed of the combine 101.

Note that the embodiments described above are merely examples. The present invention is not limited to these embodiments, and changes may be made as appropriate.

Other Variations on Second Embodiment (1) The travel device 111 may be a wheeled type, or may be a semi-crawler type.

(2) The travel stopping unit 168 may be configured to stop the travel of the combine 101 by controlling an element aside from the transmission device 152. For example, the travel stopping unit 168 may be configured to stop the travel of the combine 101 by stopping the driving of the engine 151.

(3) The configuration may be such that the conveyor chain 162 is automatically rotated in reverse after the travel of the combine 101 has been stopped by the travel stopping unit 168.

(4) A notification device that notifies the operator that the conveyance device 116 is clogged when the clog determining unit 167 has determined that the conveyance device 116 is clogged may be provided. For example, the communication terminal 104 may have a function corresponding to the notification device. In this case, the communication terminal 104 may be configured to notify the operator that the conveyance device 116 is clogged using a screen display, an alarm sound, or the like. Note that light, sound, and the like are useful for notifications made on the exterior of the combine 101.

(5) In the foregoing embodiment, the rotational speed sensor 166 is configured to obtain the rotational speed of the sprocket 163 as the "rotational speed information" according to the present invention. However, the present invention is not limited to this configuration, and the rotational speed sensor 166 may be configured to obtain the rotational speed of a member in the power transmission path that transmits power from the engine 151 to the drive shaft 163a. The rotational speed of this member in the power transmission path corresponds to the "rotational speed information" according to the present invention. Additionally, the configuration may be such that a torque sensor which detects the torque of the drive shaft 163a is provided, and the clog determining unit 167 determines that the conveyance device 116 is clogged when the torque detected by the torque sensor is relatively high. The torque sensor corresponds to the "speed obtaining unit" according to the present invention, and the torque of the drive shaft 163a corresponds to the "rotational speed information" according to the present invention.

(6) The travel stopping unit 168 may be omitted.

(7) A rotation stop sensor that obtains information indicating whether or not the rotation of the conveyor chain 162 is stopped may be provided. Additionally, the clog determining unit 167 may be configured to determine that the conveyance device 116 is clogged when the rotation of the conveyor chain 162 is stopped. Note that information indicating whether or not the rotation of the conveyor chain 162 is stopped corresponds to the "rotational speed information" according to the present invention. Additionally, the rotation stop sensor corresponds to the "speed obtaining unit" according to the present invention.

(8) The vehicle position calculating unit 121, the travel path setting unit 122, and the travel control unit 123 may be omitted. In other words, the "combine" according to the present invention need not be capable of autonomous travel.

(9) The communication terminal 104 may be omitted.

(10) In the foregoing embodiment, the operator manually operates the combine 101, and carries out harvesting travel so as to travel along a boundary line of the field in an outer circumferential part within the field, as illustrated in FIG. 11. However, the present invention is not limited to this configuration, and the configuration may be such that the combine 101 travels autonomously when carrying out the harvesting travel so as to travel along the boundary line of the field in an outer circumferential part within the field.

(11) In the foregoing embodiment, the conveyance device 116 is provided as the "conveyance device" according to the present invention. However, the present invention is not limited thereto. For example, any device that conveys the harvested crop, including a husking device, a secondary reduction device, the grain discharge device 118, and so on, corresponds to the "conveyance device" according to the present invention. If the device includes a screw, the screw corresponds to a "conveyor screw" according to the present invention. The rotational speed sensor 166 may be configured to detect the rotational speed of the screw in the device, or the rotational speed of a rotating body, such as a gear, that rotationally drives the screw, over time. The clog determining unit 167 may be configured to determine whether or not the device is clogged on the basis of the rotational speed obtained by the rotational speed sensor 166.

(12) In the foregoing embodiment, when the clog determining unit 167 has determined that the conveyance device 116 is clogged, the travel stopping unit 168 stops the travel of the combine 101. However, the present invention is not limited thereto. For example, a travel deceleration unit that reduces the travel speed when the clog determining unit 167 has determined that the conveyance device 116 is clogged may be provided. In this case, the travel deceleration unit corresponds to the "clog instance control unit" according to the present invention.

INDUSTRIAL APPLICABILITY

The present invention can be applied not only in standard combines, but in autodetachable-type combines as well.

The present invention can furthermore be used in a variety of harvesters, such as a corn harvester, a potato harvester, a carrot harvester, a sugar cane harvester, and the like.

DESCRIPTION OF REFERENCE SIGNS

3 Auger
30 Auger Shaft
31 Auger Drum
4 Engine
7 Control Unit
8 Torque Limiter
9 Auger Rotation Speed Detection Sensor
11 Harvesting Unit
12 Conveyance Device
14 Threshing Device
37 Conveyance Rotation Speed Detection Sensor (Detection Sensor)
50 Auger Power Transmission Mechanism
51 Drive Sprocket
52 Slave Sprocket
63 Engine Control Unit
64 Notification Device
73 Clog Determining Unit
73A Auger State Determining Unit
73B Conveyance State Determining Unit (Clog Determining Unit)
74 Notification Control Unit
75 Engine Rotation Speed Command Unit
76 Travel Mode Managing Unit
90 Engine Rotation Speed Detection Sensor
101 Combine (Harvester)
116 Conveyance Device
162 Conveyor Chain
163 Sprocket (Rotating Body)
166 Rotational Speed Sensor (Speed Obtaining Unit)
167, 267 Clog Determining Unit
168, 268 Travel Stopping Unit (Clog Instance Control Unit)
169 First Determining Unit
170 Deceleration Control Unit
H Harvesting Device (Harvesting Unit)
RS Prescribed Rotational Speed
R1 Vehicle Stop Threshold (First Threshold)
R2 Vehicle Speed Decrease Threshold (Second Threshold)
R3 Vehicle Speed Decrease Threshold (Second Threshold)
R4 Vehicle Speed Decrease Threshold (Second Threshold)
RS1 First Speed
RS2 Second Speed
V Vehicle Speed

The invention claimed is:

1. A harvester capable of autonomous travel in a field, the harvester comprising:
a harvesting unit that harvests a crop from the field;
a conveyance device that conveys, toward the rear of a harvester body, a whole culm of the harvested crop harvested by the harvesting unit;
an engine capable of driving the conveyance device;
a detection sensor that detects a drive speed of the conveyance device;
a clog determining unit that determines a clog of the harvested crop in the conveyance device on the basis of the drive speed;
a travel mode managing unit configured to switch a travel mode to an autonomous travel mode in which the autonomous travel is executed and to a manual travel mode in which manual travel is executed; and
a notification unit configured to make a notification indicating that the drive speed has decreased,
wherein the clog determining unit is configured to detect a clog in the conveyance device by taking a ratio of the drive speed of the conveyance device to a rotation speed of the engine,
wherein when the ratio of the drive speed of the conveyance device to the rotation speed of the engine becomes lower than a pre-set first threshold during the autonomous travel while the travel mode is the autonomous travel mode, the clog determining unit outputs a vehicle stop command that stops the harvester body, and outputs, to the notification unit, a notification command for making a notification of the decrease in the drive speed, and when the ratio of the drive speed of the conveyance device to the rotation speed of the engine becomes lower than the first threshold while the travel mode is the manual travel mode, the clog determining unit outputs the notification command to the notification unit without outputting the vehicle stop command, and
wherein the travel mode managing unit switches the travel mode from the autonomous travel mode to the manual travel mode when the vehicle stop command has been output by the clog determining unit while the travel mode is the autonomous travel mode.

2. The harvester according to claim 1,
wherein a second threshold set higher than the first threshold is provided; and
when the ratio of the drive speed of the conveyance device to the rotation speed of the engine becomes a value between the first threshold and the second threshold, the clog determining unit outputs a speed reduction command that reduces a vehicle speed of the harvester body in stages, in accordance with a magnitude of the drive speed.

* * * * *